United States Patent
Sugita

(10) Patent No.: US 9,933,603 B2
(45) Date of Patent: Apr. 3, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

(*) Notice: Subject to any disclaimer, the term of this patent is extended or adjusted under 35 U.S.C. 154(b) by 36 days.

(21) Appl. No.: 14/929,631

(22) Filed: Nov. 2, 2015

(65) Prior Publication Data

US 2016/0131879 A1    May 12, 2016

(30) Foreign Application Priority Data

Nov. 6, 2014 (JP) ................. 2014-225983

(51) Int. Cl.
*G02B 15/16* (2006.01)
*G02B 13/00* (2006.01)
*G02B 15/173* (2006.01)

(52) U.S. Cl.
CPC ................. *G02B 15/173* (2013.01)

(58) Field of Classification Search
CPC .... G02B 15/163; G02B 27/64; G02B 27/646; G02B 15/22; G02B 15/14; G02B 15/173; G02B 15/177; G02B 21/02; G02B 7/10; G02B 13/18; G02B 13/04; G02B 13/00; G02B 13/24; G02B 9/60; G02B 9/34; H04N 5/335; H04N 5/378

USPC ....... 359/657–660, 682, 684, 686, 693, 695, 359/713, 714, 750–757, 763, 764, 766, 359/772, 773, 785; 348/294
See application file for complete search history.

(56) References Cited

U.S. PATENT DOCUMENTS

| 2009/0207501 A1* | 8/2009 | Yokoyama | G02B 15/173 359/684 |
| 2011/0176224 A1* | 7/2011 | Sato | G02B 15/173 359/683 |

FOREIGN PATENT DOCUMENTS

| JP | 2010-032702 A | 2/2010 |
| JP | 2012-047814 A | 3/2012 |
| JP | 2013-152374 A | 8/2013 |

* cited by examiner

*Primary Examiner* — Jie Lei
(74) *Attorney, Agent, or Firm* — Carter, DeLuca, Farrell & Schmidt, LLP

(57) ABSTRACT

A zoom lens, includes, in order from an object side: a positive first lens unit; a negative second lens unit; and a rear lens group that includes at least two lens units and is positive as a whole over an entire zoom range, intervals between adjacent lens units changing during zooming. The second lens unit includes at least two negative lenses successively arranged including a first negative lens arranged closest to the object side and a second negative lens, an object-side surface of the first negative lens includes an aspherical surface having a positive aspherical surface amount; and an image-side surface of the first negative lens and surfaces of the second negative lens include a surface having an aspherical surface having a positive aspherical surface amount and a surface having an aspherical surface having a negative aspherical surface amount.

12 Claims, 14 Drawing Sheets

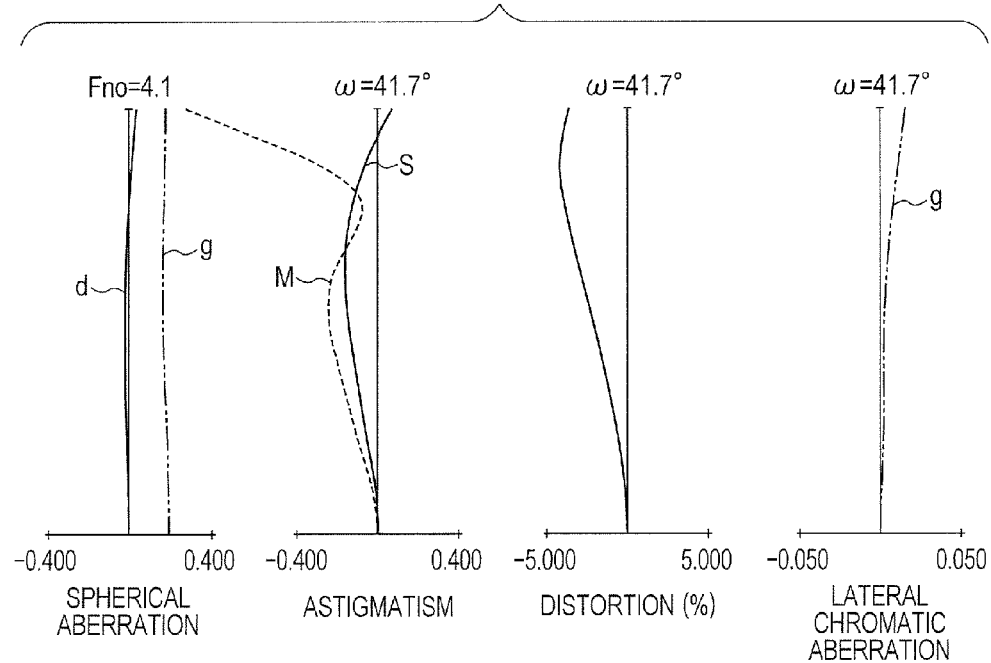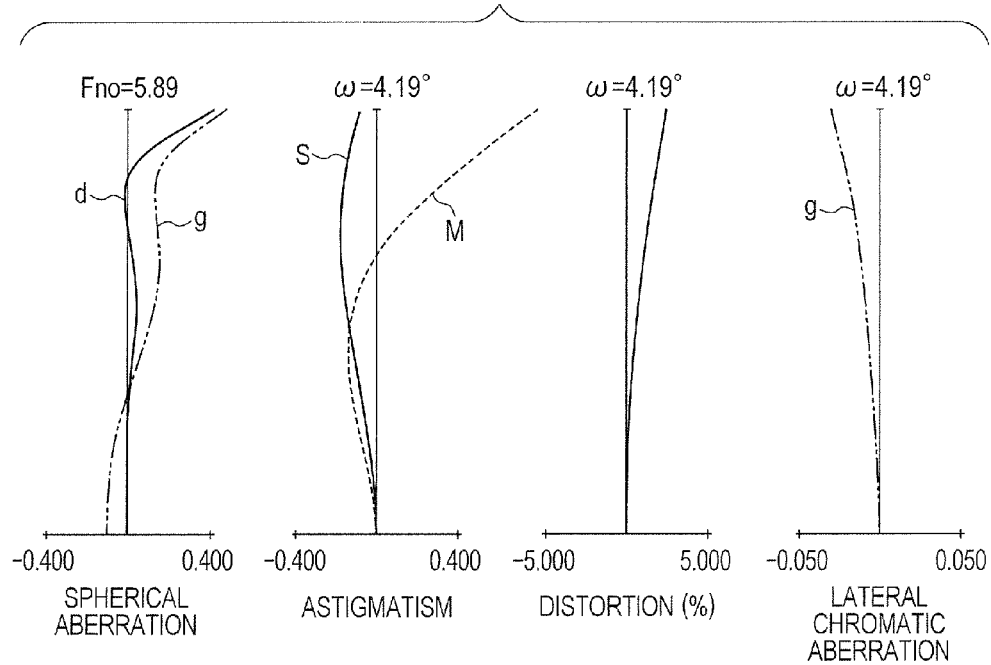

ZOOM LENS AND IMAGE PICKUP APPARATUS INCLUDING THE SAME

BACKGROUND OF THE INVENTION

Field of the Invention

The present invention relates to a zoom lens and is suitable as an image pickup optical system of an image pickup apparatus such as a digital still camera, a video camera, a TV camera, or a monitoring camera.

Description of the Related Art

In recent years, there has been a demand for highly-functional and small image pickup apparatus. Further, as an image pickup optical system to be used in those apparatus, such a zoom lens has been demanded that has a short total lens length, a high zoom ratio, and high optical performance over an entire zoom range. As a small zoom lens having a high zoom ratio, there is known a positive-lead type zoom lens in which a lens unit having a positive refractive power is arranged at a position closest to an object side.

In Japanese Patent Application Laid-Open No. 2010-032702, there is disclosed a zoom lens including, in order from an object side to an image side, five lens units respectively having positive, negative, positive, negative, and positive refractive powers, the zoom lens being configured such that an interval between adjacent lens units is changed during zooming. In Japanese Patent Application Laid-Open No. 2013-152374, there is disclosed a zoom lens including, in order from an object side to an image side, a first lens unit to a fourth lens unit respectively having positive, negative, positive, and positive refractive powers, in which all of the lens units are configured to move during zooming. In Japanese Patent Application Laid-Open No. 2012-47814, there is disclosed a zoom lens including, in order from an object side to an image side, a first lens unit to a sixth lens unit respectively having positive, negative, positive, positive, negative, and positive refractive powers, the zoom lens being configured such that an interval between adjacent lens units is changed during zooming.

In order to achieve downsizing and higher resolving power of the positive-lead type zoom lens described above, for example, it is effective to increase a refractive power of the second lens unit having a negative refractive power, which has a strong magnification-varying action. However, when the refractive power of the second lens unit is simply increased, the occurrence of various aberrations is increased in the second lens unit and it becomes difficult to obtain high optical performance over the entire zoom range.

In order to reduce various aberrations that occur due to an increase in zoom ratio while downsizing the zoom lens, to thereby obtain excellent optical performance, it is important to appropriately set the lens configuration of each of the lens units forming the zoom lens, a refractive power of each of the lens units, a zoom type of the zoom lens, and the like. Moreover, the use of an aspherical lens facilitates the correction of the various aberrations.

However, in order to reduce the occurrence of the various aberrations with the use of the aspherical lens, simply using the aspherical lens is insufficient and it is important to appropriately set a position of the aspherical surface in the optical system, a lens to which the aspherical surface is applied, an aspherical surface amount of the aspherical surface, and the like. If those configurations are not appropriate, it is extremely difficult to obtain the high optical performance over the entire zoom range while downsizing the zoom lens and achieving the higher zoom ratio.

SUMMARY OF THE INVENTION

According to one embodiment of the present invention, there is provided a zoom lens, including, in order from an object side to an image side: a first lens unit having a positive refractive power; a second lens unit having a negative refractive power; and a rear lens group that includes at least two lens units and has a positive refractive power over an entire zoom range, the zoom lens being configured such that intervals between adjacent lens units changes during zooming, the second lens unit including at least two successively arranged negative lenses, the at least two successively arranged negative lenses including a first negative lens arranged closest to the object side and a second negative lens, in which an object-side lens surface of the first negative lens is an aspherical lens surface having a positive aspherical surface amount; and of an image-side lens surface of the first negative lens, an object-side lens surface of the second negative lens, and an image-side lens surface of the second negative lens, at least one lens surface is an aspherical lens surface having a positive aspherical surface amount and at least one lens surface is an aspherical lens surface having a negative aspherical surface amount.

Further features of the present invention will become apparent from the following description of exemplary embodiments with reference to the attached drawings.

BRIEF DESCRIPTION OF THE DRAWINGS

FIG. 8A is an aberration diagram of the zoom lens at a wide angle end according to Embodiment 4 (Numerical Embodiment 4) of the present invention.

FIG. 8B is an aberration diagram of the zoom lens at a telephoto end according to Embodiment 4 (Numerical Embodiment 4) of the present invention.

DESCRIPTION OF THE EMBODIMENTS

In the following, exemplary embodiments of the present invention are described in detail with reference to the attached drawings. A zoom lens of the present invention includes, in order from an object side to an image side, a first lens unit having a positive refractive power, a second lens unit having a negative refractive power, and a rear lens group that includes at least two lens units and has a positive refractive power as a whole over an entire zoom range. In the zoom lens, an interval between adjacent lens units is changed during zooming.

Figure 1:
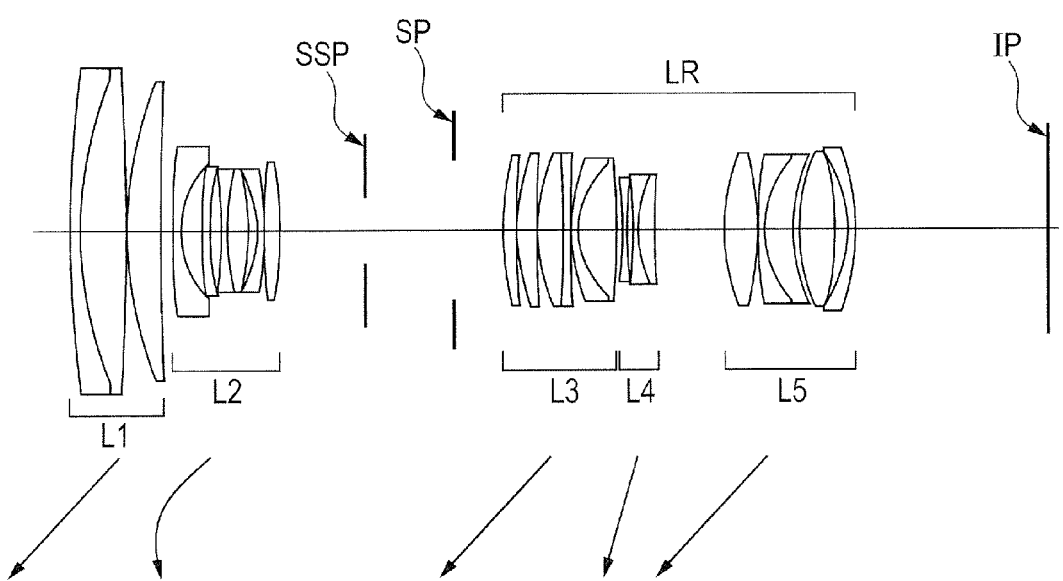
FIG. 1 is a cross-sectional view of a zoom lens according to Embodiment 1 of the present invention.
Figure 2A:
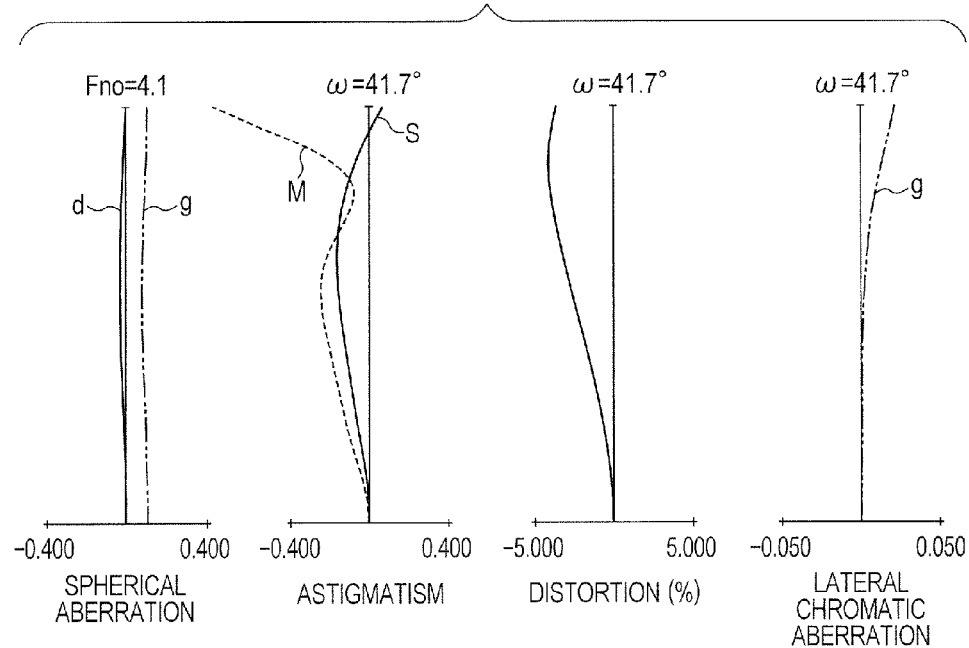
FIG. 2A is an aberration diagram of the zoom lens at a wide angle end according to Embodiment 1 (Numerical Embodiment 1) of the present invention.
Figure 2B:
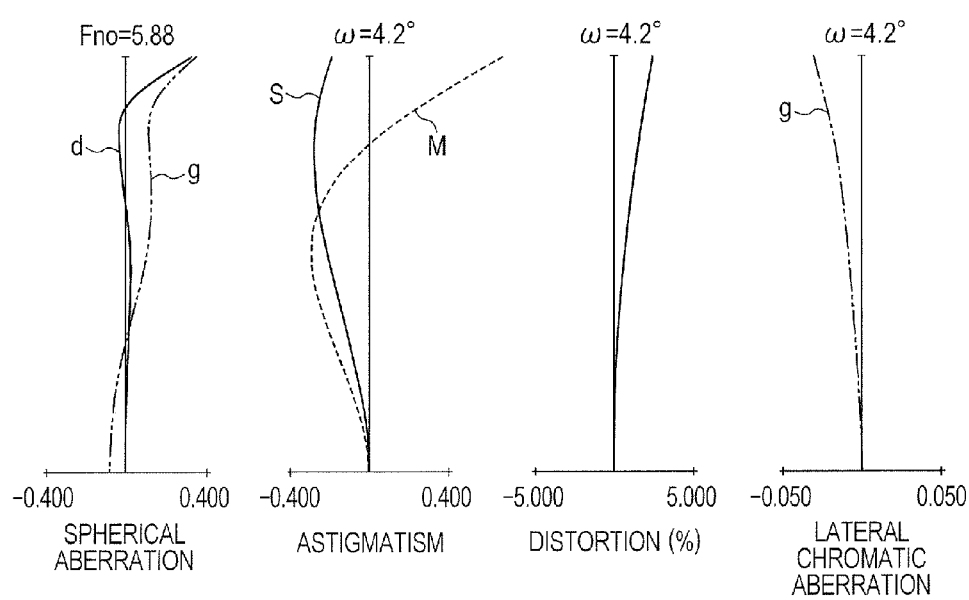
FIG. 2B is an aberration diagram of the zoom lens at a telephoto end according to Embodiment 1 (Numerical Embodiment 1) of the present invention.
Figure 3:
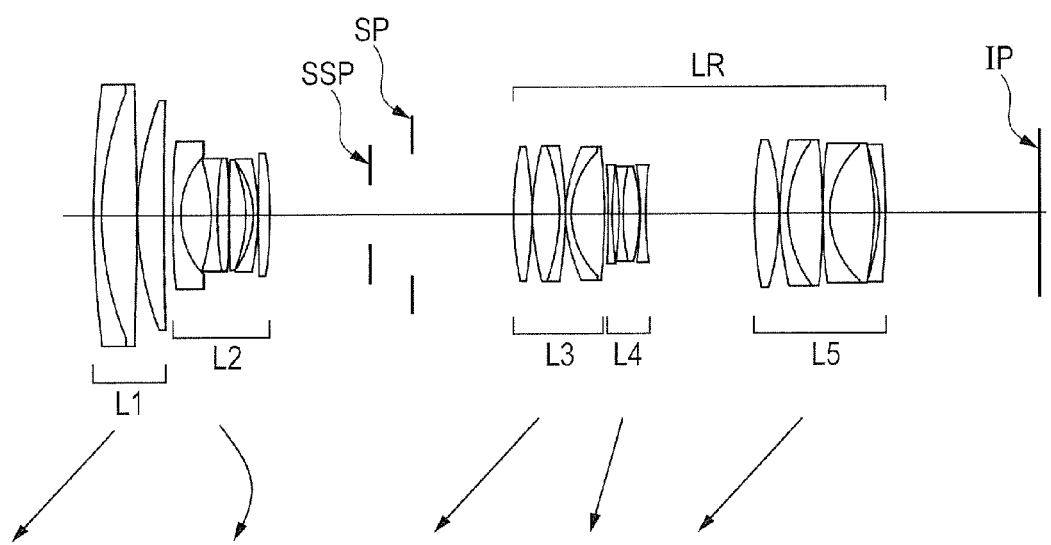
FIG. 3 is a cross-sectional view of a zoom lens according to Embodiment 2 of the present invention.
Figure 4A:
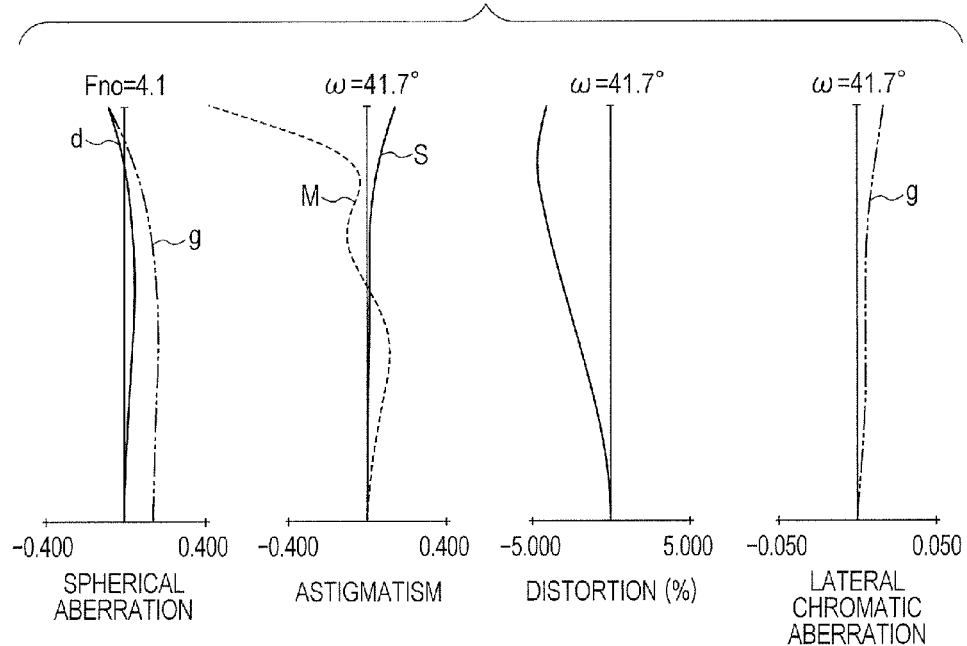
FIG. 4A is an aberration diagram of the zoom lens at a wide angle end according to Embodiment 2 (Numerical Embodiment 2) of the present invention.
Figure 4B:
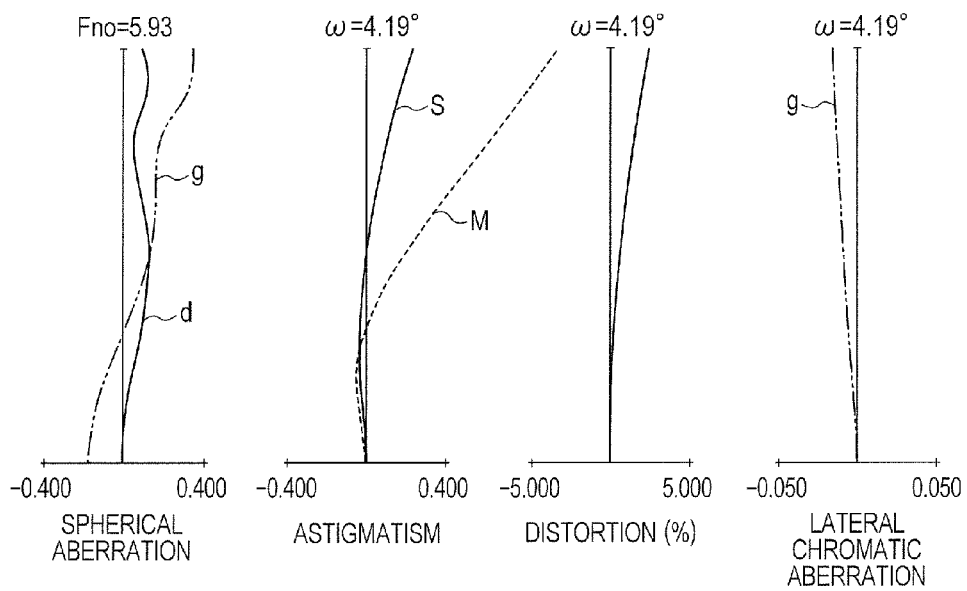
FIG. 4B is an aberration diagram of the zoom lens at a telephoto end according to Embodiment 2 (Numerical Embodiment 2) of the present invention.

FIG. 1 is a lens cross-sectional view of a zoom lens at a wide angle end (short focal length end) according to Embodiment 1 of the present invention. FIG. 2A is an aberration diagram of the zoom lens at the wide angle end according to Embodiment 1, and FIG. 2B is an aberration diagram of the zoom lens at a telephoto end (long focal length end) according to Embodiment 1. The zoom lens of Embodiment 1 has a zoom ratio of 12.14 and an F-number of 4.10 to 5.88. FIG. 3 is a lens cross-sectional view of a zoom lens at a wide angle end according to Embodiment 2 of the present invention. FIG. 4A is an aberration diagram of the zoom lens at the wide angle end according to Embodiment 2, and FIG. 4B is an aberration diagram of the zoom lens at a telephoto end according to Embodiment 2. The zoom lens of Embodiment 2 has a zoom ratio of 12.14 and an F-number of 4.10 to 5.93.

Figure 5:
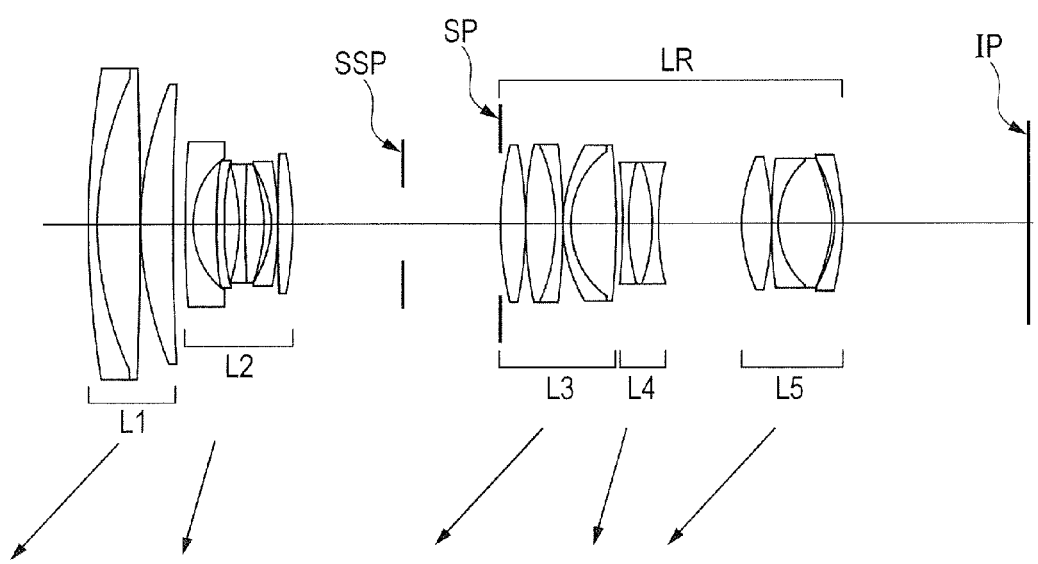
FIG. 5 is a cross-sectional view of a zoom lens according to Embodiment 3 of the present invention.
Figure 6A:
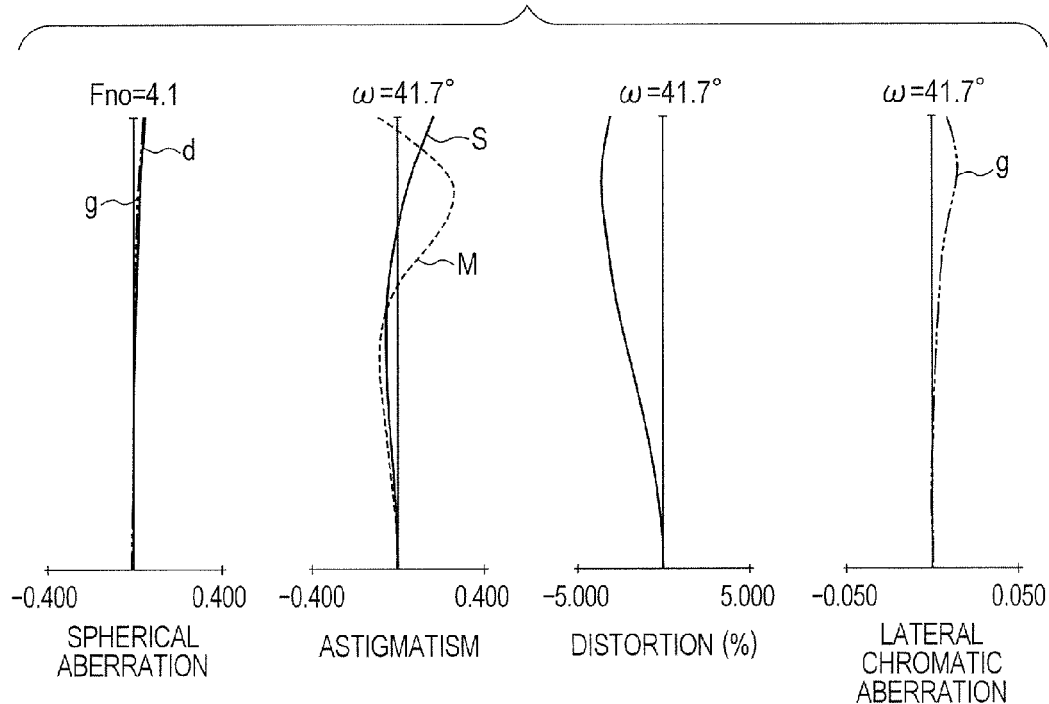
FIG. 6A is an aberration diagram of the zoom lens at a wide angle end according to Embodiment 3 (Numerical Embodiment 3) of the present invention.
Figure 6B:
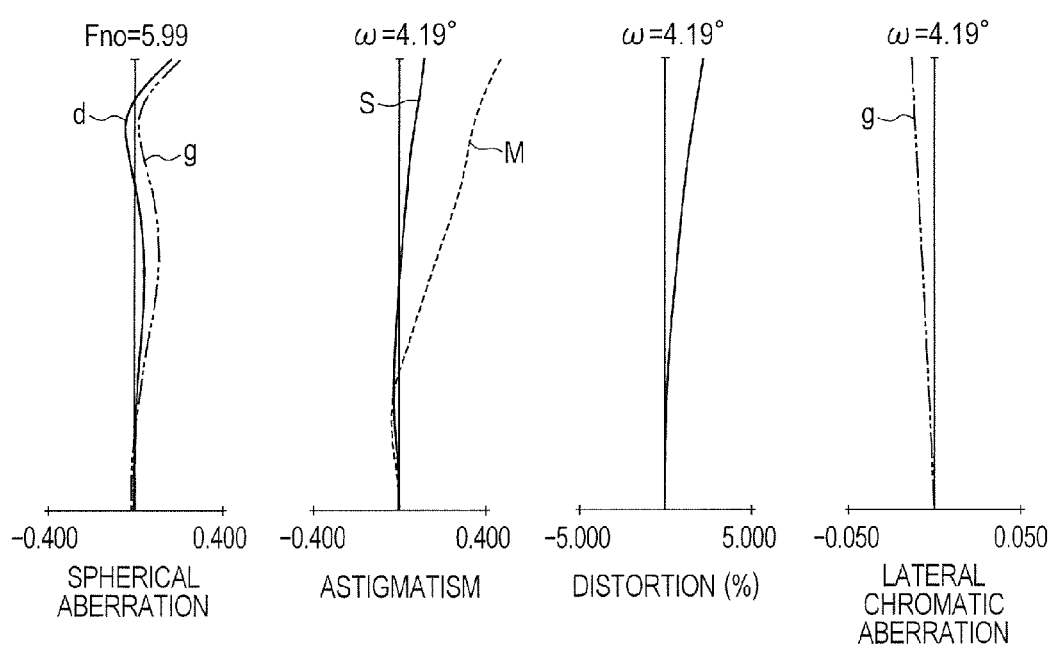
FIG. 6B is an aberration diagram of the zoom lens at a telephoto end according to Embodiment 3 (Numerical Embodiment 3) of the present invention.
Figure 7:
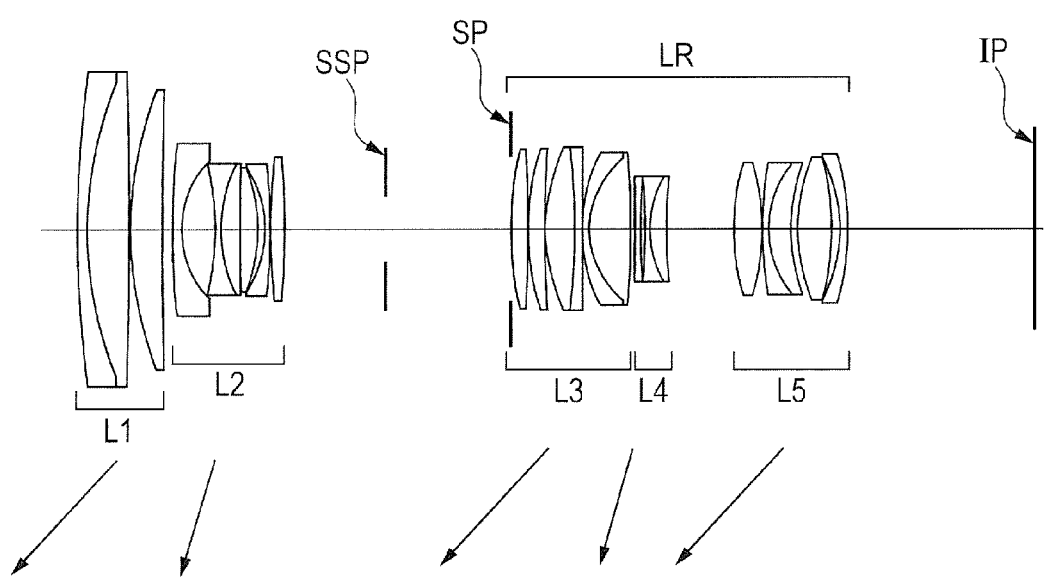
FIG. 7 is a cross-sectional view of a zoom lens according to Embodiment 4 of the present invention.

FIG. 5 is a lens cross-sectional view of a zoom lens at a wide angle end according to Embodiment 3 of the present invention. FIG. 6A is an aberration diagram of the zoom lens at the wide angle end according to Embodiment 3, and FIG. 6B is an aberration diagram of the zoom lens at a telephoto end according to Embodiment 3. The zoom lens of Embodiment 3 has a zoom ratio of 12.14 and an F-number of 4.10 to 5.99. FIG. 7 is a lens cross-sectional view of a zoom lens at a wide angle end according to Embodiment 4 of the present invention. FIG. 8A is an aberration diagram of the zoom lens at the wide angle end according to Embodiment 4, and FIG. 8B is an aberration diagram of the zoom lens at a telephoto end according to Embodiment 4. The zoom lens of Embodiment 4 has a zoom ratio of 12.14 and an F-number of 4.10 to 5.89.

Figure 9:
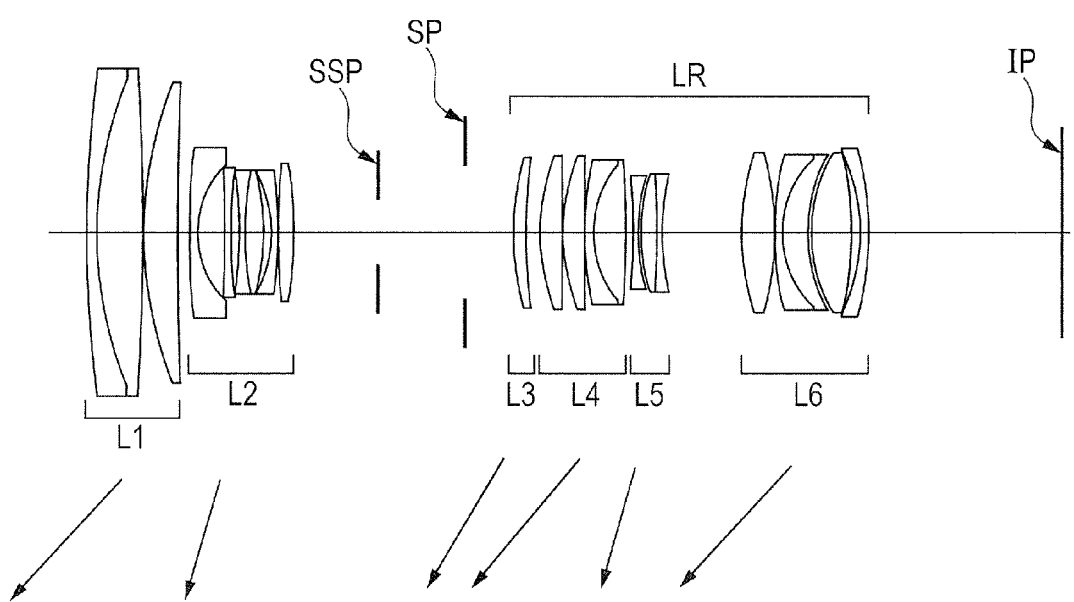
FIG. 9 is a cross-sectional view of a zoom lens according to Embodiment 5 of the present invention.
Figure 10A:
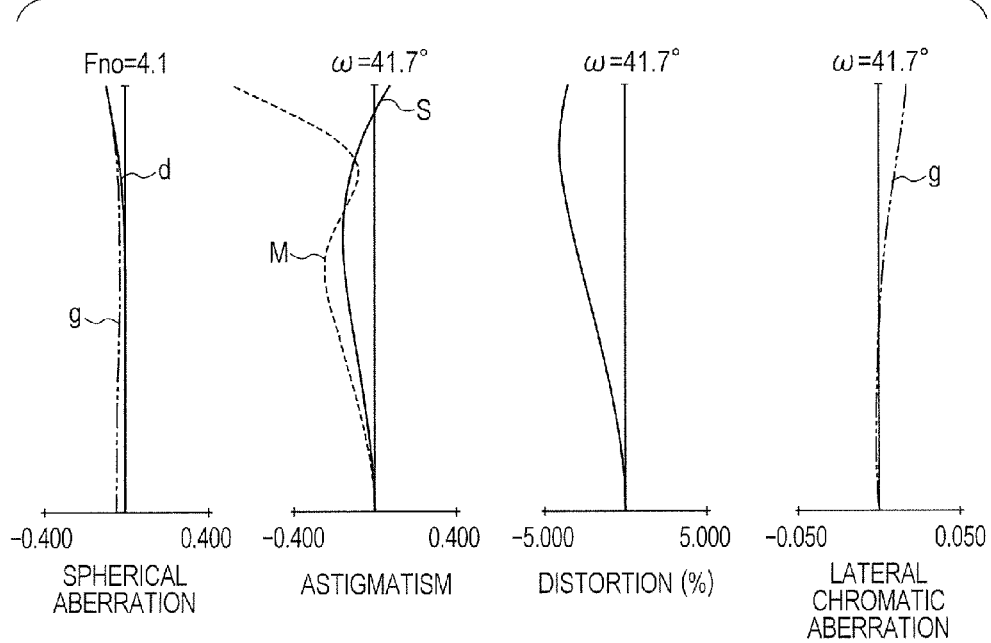
FIG. 10A is an aberration diagram of the zoom lens at a wide angle end according to Embodiment 5 (Numerical Embodiment 5) of the present invention.
Figure 10B:
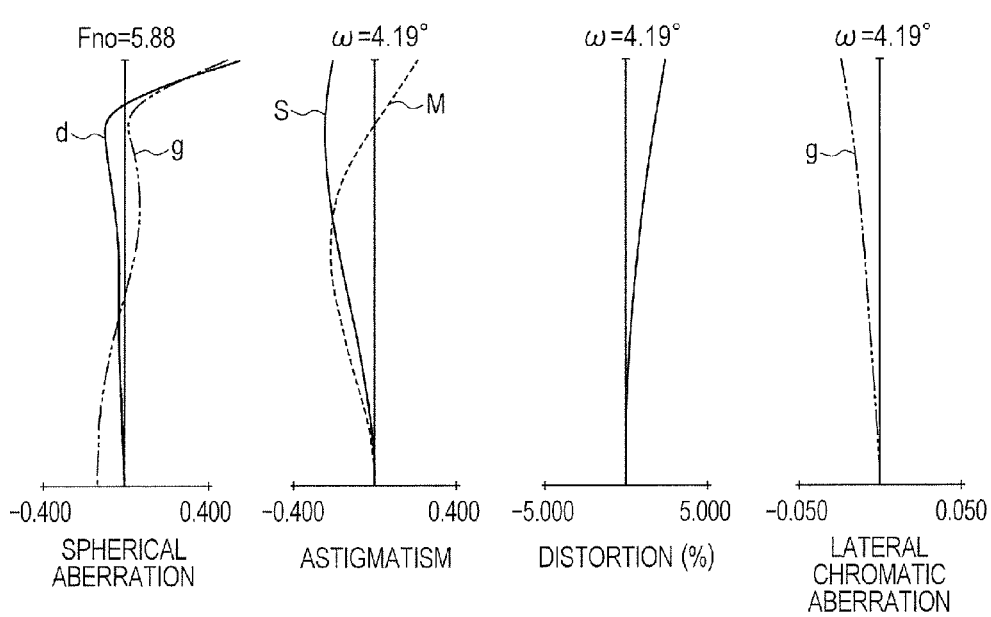
FIG. 10B is an aberration diagram of the zoom lens at a telephoto end according to Embodiment 5 (Numerical Embodiment 5) of the present invention.
Figure 11:
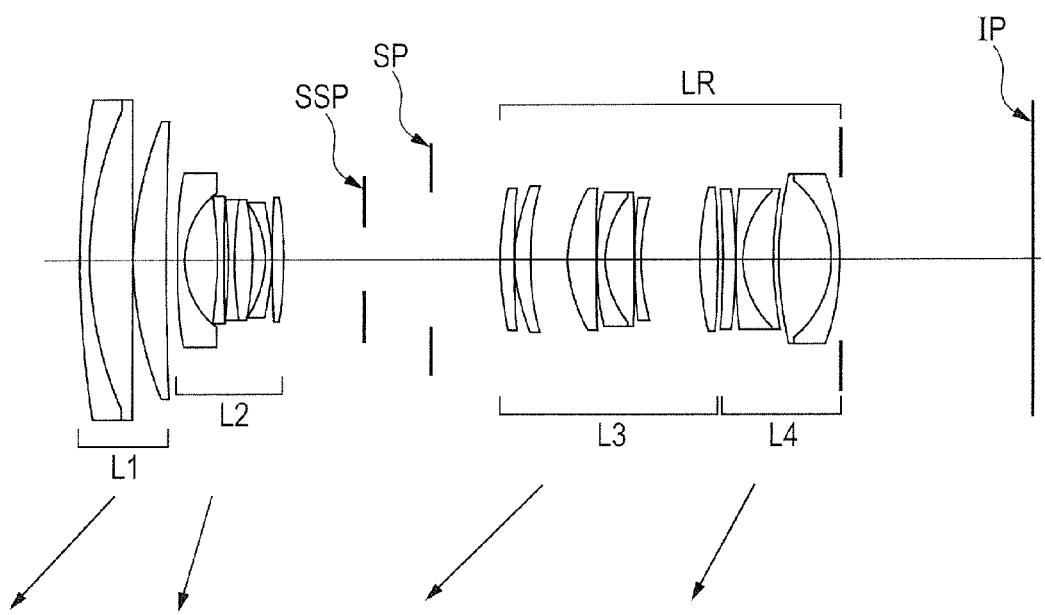
FIG. 11 is a cross-sectional view of a zoom lens according to Embodiment 6 of the present invention.
Figure 12A:
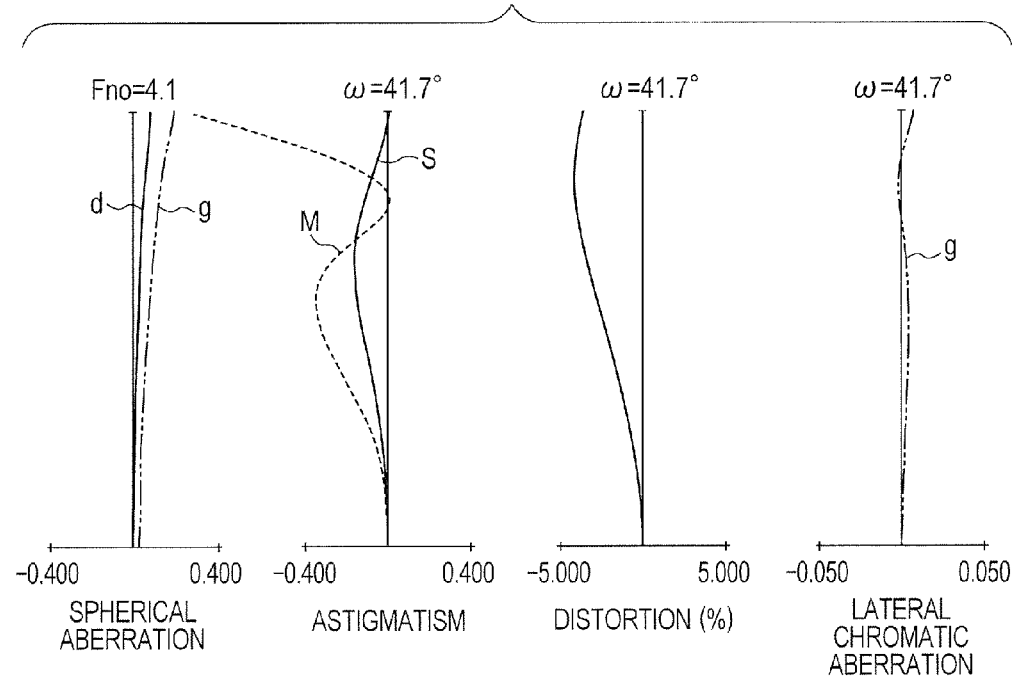
FIG. 12A is an aberration diagram of the zoom lens at a wide angle end according to Embodiment 6 (Numerical Embodiment 6) of the present invention.
Figure 12B:
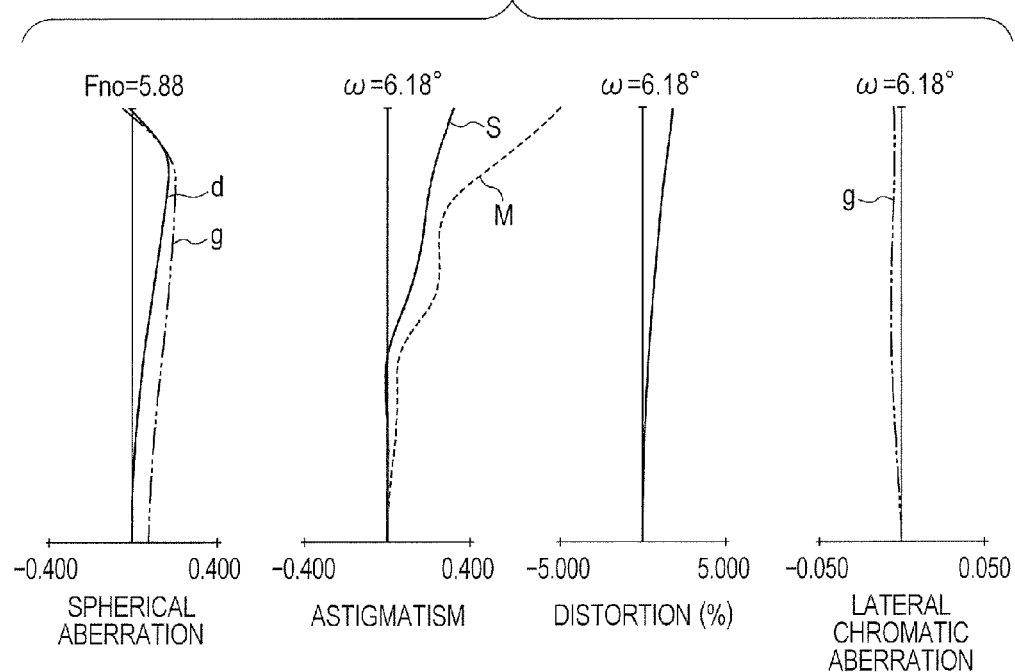
FIG. 12B is an aberration diagram of the zoom lens at a telephoto end according to Embodiment 6 (Numerical Embodiment 6) of the present invention.

FIG. 9 is a lens cross-sectional view of a zoom lens at a wide angle end according to Embodiment 5 of the present invention. FIG. 10A is an aberration diagram of the zoom lens at the wide angle end according to Embodiment 5, and FIG. 10B is an aberration diagram of the zoom lens at a telephoto end according to Embodiment 5. The zoom lens of Embodiment 5 has a zoom ratio of 12.14 and an F-number of 4.10 to 5.88. FIG. 11 is a lens cross-sectional view of a zoom lens at a wide angle end according to Embodiment 6 of the present invention. FIG. 12A is an aberration diagram of the zoom lens at the wide angle end according to Embodiment 6, and FIG. 12B is an aberration diagram of the zoom lens at a telephoto end according to Embodiment 6.

Figure 13:
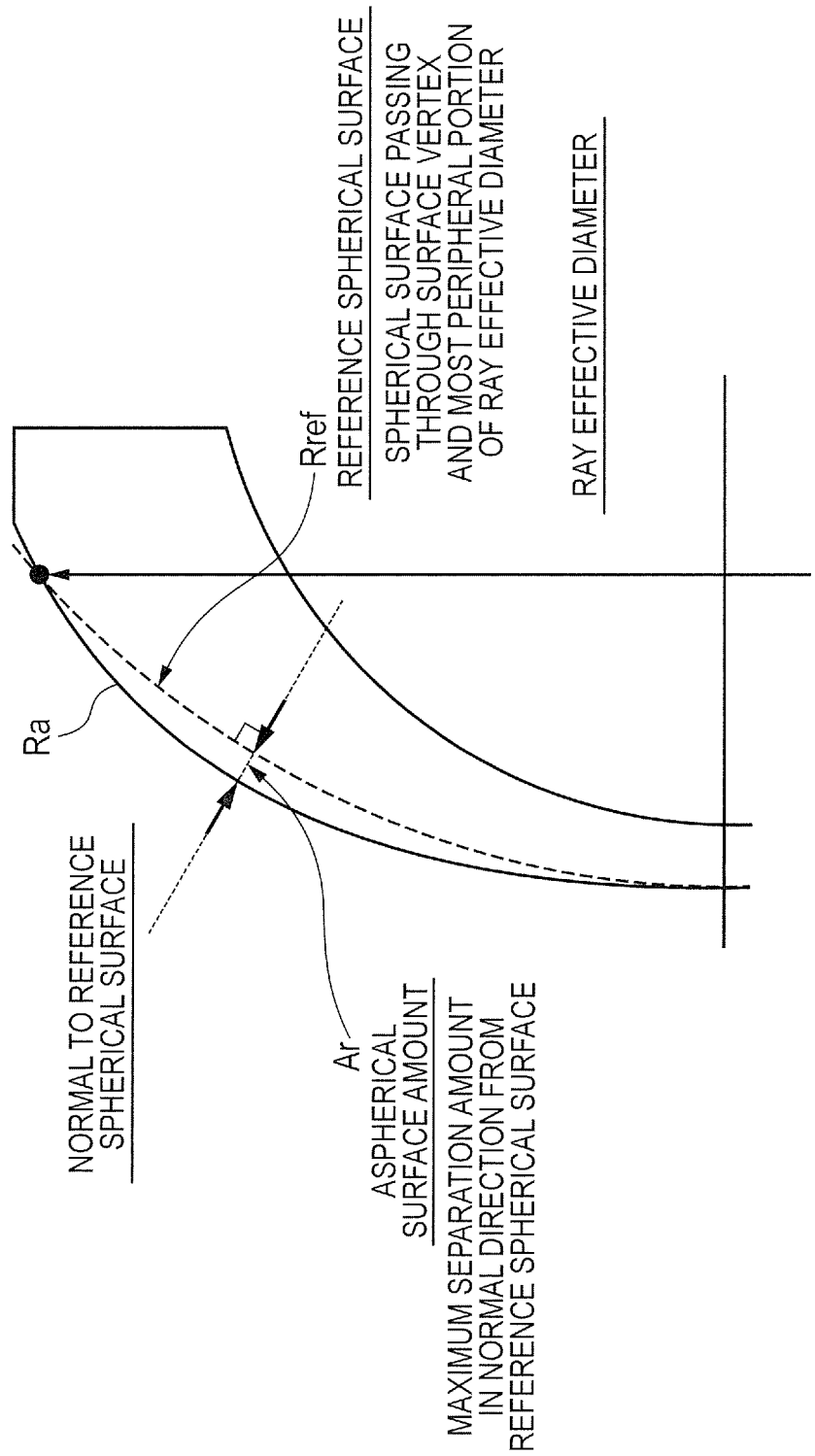
FIG. 13 is an explanatory diagram of an aspherical surface amount.
Figure 14:
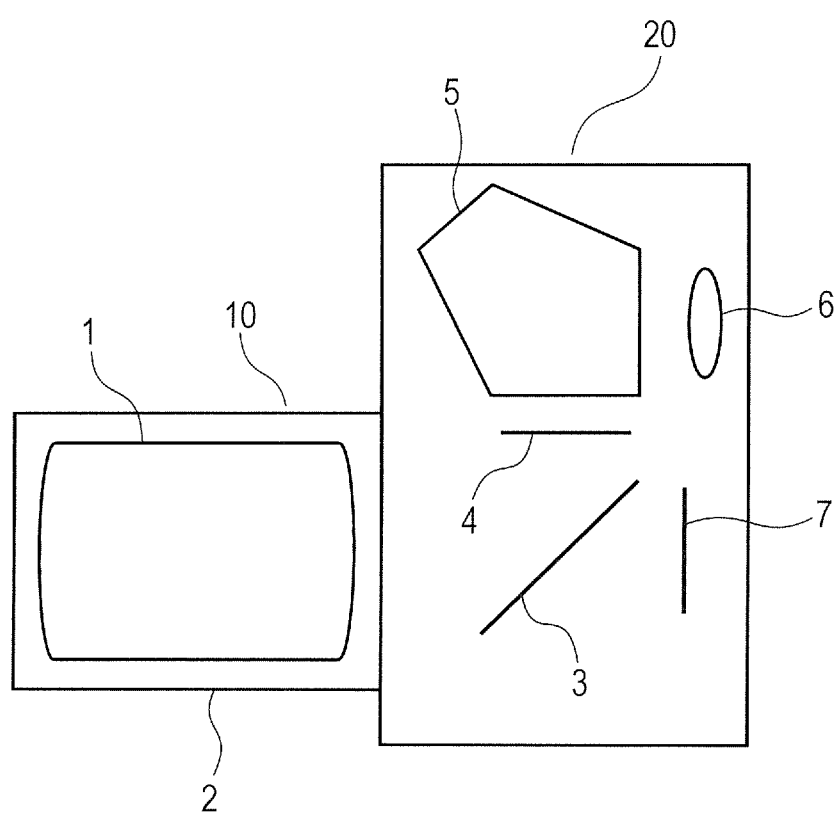
FIG. 14 is a schematic diagram of a main part of an image pickup apparatus of the present invention.

The zoom lens of Embodiment 6 has a zoom ratio of 8.23 and an F-number of 4.10 to 5.88. FIG. 13 is an explanatory diagram of an aspherical surface amount of a lens surface. FIG. 14 is a schematic diagram of a main part of a digital still camera (image pickup apparatus) including the zoom lens of the present invention.

In the lens cross-sectional view, the left side corresponds to the object side (front side) and the right side corresponds to the image side (rear side). In the lens cross-sectional view, Li represents the i-th lens unit, in which "i" indicates an order of the lens units from the object side to the image side. LR represents a rear lens group that includes at least two lens units and has a positive refractive power as a whole over the entire zoom range. SP represents an F-number determining member acting as an aperture stop for determining a minimum F-number (Fno) light flux (hereinafter referred to as "aperture stop"). SSP represents a variable stop, which cuts flare light.

IP represents an image plane. When the zoom lens is used as an image pickup optical system of a video camera or a digital still camera, an image plane of a solid state image pickup element (photoelectric converting element), such as a CCD sensor or a CMOS sensor, is disposed. In addition, when the zoom lens is used as an image pickup optical system of a silver halide film camera, a photosensitive surface corresponding to a film plane is disposed. In the spherical aberration diagram, d indicates the d-line (at a wavelength of 587.6 nm), and g indicates the g-line (at a wavelength of 435.8 nm). In the astigmatism diagram, M indicates a meridional image plane, and S indicates a sagittal image plane. Distortion represents distortion at the d-line. In addition, the lateral chromatic aberration indicates a difference of the g-line with reference to the d-line.

Fno represents an F-number. A symbol A represents an image-pickup half angle of field (degrees). Note that, in the following Embodiments, the wide angle end and the telephoto end are zoom positions when a magnification-varying lens unit is located at each end of a mechanically movable range on the optical axis. In the lens cross-sectional view, the arrow indicates a movement locus of each lens unit for zooming from the wide angle end to the telephoto end.

Next, the definition of an aspherical surface amount of an aspherical surface formed as the lens surface according to the present invention is described. An aspherical surface amount Ar indicates, as illustrated in FIG. 13, the maximum separation amount of an aspherical surface Ra from a reference spherical surface Rref. A radius (curvature radius) of the reference spherical surface Rref is a radius of a spherical surface determined by a surface vertex and a ray effective diameter of the surface. In a separation direction of the aspherical surface Ra from the reference spherical surface Rref, an aspherical surface amount in a direction in which a medium is added on the reference spherical surface Rref is defined as a positive aspherical surface amount, whereas an aspherical surface amount in a direction in which the medium is removed from the reference spherical surface Rref is defined as a negative aspherical surface amount. For example, the aspherical surface Ra illustrated in FIG. 13 has a positive aspherical surface amount.

According to the present invention, the aspherical surface having a positive aspherical surface amount refers to the one satisfying Conditional Expression (xa), whereas the aspherical surface having a negative aspherical surface amount refers to the one satisfying Conditional Expression (xb).

$$0.0003 < Ar/Ea \times Nd \quad \text{(xa)}$$

$$-0.0003 > Ar/Ea \times Nd \quad \text{(xb)}$$

Ar represents an aspherical surface amount.
Ea represents a ray effective diameter of an aspherical surface.
Nd represents a refractive index of a material of an aspherical lens.

An aspherical surface not satisfying both Conditional Expressions (xa) and (xb) has a small aspherical surface effect and does not provide an effect of the present invention satisfactorily. Such an aspherical surface is thus not included in the aspherical surface according to the present invention.

Next, there is described a method of determining whether an aspherical surface amount has a positive value or a negative value based on lens data of publications or an actual lens. Moreover, a method of calculating an aspherical surface amount is specifically described. In order to determine whether an aspherical surface amount has a positive value or a negative value, or to calculate an aspherical surface amount, a radius (curvature radius) of a reference spherical surface needs to be obtained first. In order to obtain the radius of the reference spherical surface, a ray effective diameter needs to be obtained.

The lens data of the publications does not include an effective diameter in some cases. In such a case, the easiest method for obtaining a ray effective diameter is as follows: a drawing magnification is obtained based on a full scale of a total lens length on a drawing of a lens cross-sectional view and a known total lens length indicated by numerical data, and then a full scale of a diameter of a curved surface portion on the drawing is multiplied by the drawing magnification. The diameter of the curved surface portion of the lens on the drawing is set slightly larger than an actual ray effective diameter depending on optical tools. However, this method is enough for determining whether an aspherical surface amount has a positive value or a negative value, or grasping a rough aspherical surface amount.

A ray effective diameter is obtained with more accuracy by a method of calculating a ray effective diameter with a marginal contact portion or a biconvex lens in a first lens unit having a negative refractive power. In a wide-angle photographing lens, when a first lens unit having a negative refractive power has a narrower lens interval between a plurality of successive negative lenses, the downsizing of the zoom lens and correction of curvature of field are easier. Accordingly, almost all of wide-angle photographing lenses include a lens pair in marginal contact in which the peripheral portions of the negative lenses are in contact with each other.

Moreover, also in the periphery of the biconvex lens, in general, processing of making a thickness of the periphery of the lens as thin as possible enables the downsizing of the zoom lens and the correction of the curvature of field with ease. For this reason, for all of lens surfaces in the first lens unit, points at which the lens surfaces intersect are set as assumed effective diameters, and then ray tracing is performed. As a result, the outermost light flux is determined at any one of the assumed effective diameters. Heights of the ray at the respective lens surfaces correspond to the ray effective diameter.

Next, a method of calculating a ray effective diameter with an actual lens is described. The easiest method for obtaining a ray effective diameter is to measure diameters of polished surface portions of respective lenses. In order to obtain a light main body, a margin to the outermost diameter of the polished surface of the lens is set to be as small as possible with respect to an effective diameter in many cases. Consequently, a ray effective diameter accurate in some extent is obtained with measurement of the diameters of the polished surfaces themselves, which is enough to determine whether an aspherical surface amount has a positive value or a negative value, or grasp a rough aspherical surface amount.

A ray effective diameter is grasped with more accuracy by a method involving measuring inner diameters of light blocking members mostly present in a first lens unit having a negative refractive power. In general, when an edge portion, which is a boundary between a polished surface and a coarse surface, is exposed to strong light, the light is irregularly reflected at the edge portion to cause ghost light. Accordingly, a method of cutting unnecessary light is widely employed in which the light blocking members are arranged depending on a ray effective diameter, to thereby prevent the boundary between the polished surface and the coarse surface from being exposed to the unnecessary light. The light blocking members are set as assumed effective diameters, and then ray tracing is performed.

As a result, the outermost light flux is determined at any one of the assumed effective diameters. Heights of the ray at the respective lens surfaces correspond to the ray effective diameter. Moreover, a method of obtaining an accurate ray effective diameter with another approach is described. In the method, a lens system is used in combination with an image pickup apparatus or a projection apparatus, and a light blocking member is gradually inserted toward the center from a lens peripheral portion at the foremost surface in the lens system. A position of the light blocking member immediately before a shadow appears on a photographed image or a projected image corresponds to a ray effective diameter of the foremost surface in the lens system. Ray tracing is performed for the ray effective diameter of the foremost surface, thereby being capable of grasping ray effective diameters of surfaces in the first lens unit other than the foremost surface.

Next, there is described a method for reducing distortion and astigmatism over the entire zoom range in the zoom lens having a high zoom ratio according to the present invention. In order to satisfactorily correct distortion and astigmatism over the entire zoom range in the zoom lens having a high zoom ratio, it is necessary to reduce aberration variation during zooming from the wide angle end to the telephoto end. In particular, how distortion at the wide angle end is corrected is important, at which large barrel-shaped distortion occurs.

As the easiest method for reducing distortion, it is preferred to decrease the refractive powers of the first lens unit and the second lens unit, to thereby reduce distortion and astigmatism themselves occurring between those lens units. However, this method significantly increases the size of the zoom lens. Accordingly, in the present invention, an attention is paid to a change in an incident height ha of an off-axial principal ray during zooming. In the zoom lens having a high zoom ratio, at the wide angle end at which the incident height ha of the off-axial principal ray at the magnification-varying second lens unit having a negative refractive power is extremely large, much barrel-shaped distortion occurs due to the negative refractive power. On the other hand, at the telephoto end at which the off-axial principal ray passes at a position near an optical axis, distortion hardly occurs.

In Japanese Patent Application Laid-Open No. 2010-032702 and Japanese Patent Application Laid-Open No. 2013-152374, an aspherical surface having a strong positive aspherical surface amount is arranged as a lens surface of the second lens unit closest to the object side, to thereby satisfactorily correct distortion at the wide angle end. It is thus found that, with this configuration, distortion and astigmatism are significantly changed when the incident height ha of the off-axial principal ray is changed due to zooming.

From this, the following is found: in order to satisfactorily correct distortion and astigmatism over the entire zoom range in the zoom lens having a high zoom ratio of the present invention, it is effective to disperse a correction effect rather than only correcting, by one lens surface, distortion at the wide angle end at which most distortion occurs.

Specifically, a second lens unit L2 includes, in order from the object side to the image side, at least two successively arranged negative lenses. Of the successively arranged negative lenses, a negative lens arranged at a position closest to the object side is a negative lens G2a (a first negative lens), and a negative lens that is included in the successively arranged negative lenses and is different from the negative lens G2a is a negative lens G2b (a second negative lens).

In this case, an object-side lens surface of the negative lens G2a has an aspherical shape having a positive aspherical surface amount. Of an image-side lens surface of the negative lens G2a, an object-side lens surface of the negative lens G2b, and an image-side lens surface of the negative lens G2b, at least one lens surface is an aspherical lens surface having a positive aspherical surface amount and at least one lens surface is an aspherical lens surface having a negative aspherical surface amount.

With this, astigmatism is corrected by the aspherical surface having a negative aspherical surface amount while distortion is corrected by two aspherical surfaces having a relatively weak positive aspherical surface amount in a dispersed manner. In this way, even when the incident height ha of the off-axial principal ray is significantly changed during zooming, significant variation in effect of the aspherical surface is suppressed.

For example, this aberration correction method satisfactorily corrects a spherical aberration by using, in order to form a lens unit having a positive refractive power, two positive lenses made of a material having a low refractive index and one negative lens made of a material having a high refractive index rather than using a single positive lens. Moreover, this method is similar to an abbreviation correction concept capable of reducing the Petzval sum.

According to the present invention, distortion and astigmatism are satisfactorily corrected over the entire zoom range in the zoom lens having a high zoom ratio as described above.

Next, other features of the zoom lens of the present invention are described. The zoom lens of the present invention includes a first lens unit L1 having a positive refractive power, the second lens unit L2 having a negative refractive power, and a rear lens group LR that includes at least two lens units and has a positive refractive power as a whole over the entire zoom range. Further, the second lens unit L2 includes, in order from the object side to the image side, at least two successively arranged negative lenses. Of the negative lenses, the negative lens closest to the object side is the negative lens G2a and one of the other negative lenses is the negative lens G2b.

Further, the object-side surface of the negative lens G2a is an aspherical surface having a positive aspherical surface amount, and at least two lens surfaces of the remaining three lens surfaces are an aspherical surface having a positive aspherical surface amount and an aspherical surface having a negative aspherical surface amount. With this, rapid variation in distortion and astigmatism due to zooming is suppressed while barrel-shaped distortion is satisfactorily corrected at the wide angle end.

Next, preferred conditions for carrying out the present invention are described. It is preferred that a lens other than the negative lens G2a and the negative lens G2b have a spherical surface or a lens surface regarded as the above-mentioned spherical surface. With this, an aspherical surface is used only at a position at which the incident height ha of the off-axial principal ray is low, and hence sensitivity of manufacturing errors relating to spherical aberration and coma can be reduced.

In the present invention, it is more preferred that at least one of the following conditional expressions be satisfied. A distance on the optical axis from the lens surface of the second lens unit L2 closest to the object side to a lens surface of the aspherical lens surfaces included in the second lens unit L2, which is closest to the image side, is represented by Dasp. A distance (lens unit length) on the optical axis from the lens surface of the second lens unit L2 closest to the object side to the lens surface of the second lens unit L2 closest to the image side is represented by BLD2. A focal length of the first lens unit L1 is represented by f1, and a focal length of the zoom lens at the wide angle end is represented by fw. A focal length of the second lens unit L2 is represented by f2. In this case, it is preferred to satisfy at least one of the following conditional expressions.

$$0.15 < Dasp/BLD2 < 0.60 \quad (1)$$

$$4.0 < f1/fw < 8.0 \quad (2)$$

$$0.60 < -f2/fw < 1.10 \quad (3)$$

Next, technical meanings of the respective conditional expressions are described. Conditional Expression (1) is satisfied in order to effectively correct distortion and astigmatism. When the upper limit of Conditional Expression (1) is exceeded, the incident height ha of the off-axial principal ray is lowered at the wide angle end, and an effect of correcting distortion and astigmatism is thus weakened. When the lower limit of Conditional Expression (1) is exceeded, a difference in the incident height ha of the off-axial principal ray between a positive aspherical surface and a negative aspherical surface is reduced, and a compensating effect for astigmatism is thus weakened. It is more preferred to set the numerical range of Conditional Expression (1) as follows.

$$0.2 < Dasp/BLD2 < 0.5 \quad (1a)$$

Conditional Expressions (2) and (3) are satisfied in order to obtain high optical performance while downsizing the zoom lens. When the upper limit of Conditional Expression (2) or (3) is exceeded, the size of the zoom lens is increased. When the lower limit of Conditional Expression (2) or (3) is exceeded, on the other hand, spherical aberration is greatly varied during zooming and it becomes difficult to obtain high optical performance. It is more preferred to set the numerical ranges of Conditional Expressions (2) and (3) as follows.

$$4.5 < f1/fw < 7.5 \quad (2a)$$

$$0.70 < -f2/fw < 1.00 \quad (3a)$$

In each of Embodiments, the second lens unit L2 is configured to move to perform focusing. In each of Embodiments, the second lens unit L2 preferably includes at least three negative lenses and at least two positive lenses. With this, distortion and astigmatism are easily corrected by the second lens unit L2.

In each of Embodiments, the rear lens group LR consists of, in order from the object side to the image side, a third lens unit L3 having a positive refractive power, a fourth lens unit L4 having a negative refractive power, and a fifth lens unit L5 having a positive refractive power. Further, during zooming from the wide angle end to the telephoto end, the first lens unit L1, the third lens unit L3, the fourth lens unit L4, and the fifth lens unit L5 are configured to move to the object side. The second lens unit L2 is configured to move along a locus convex to the object side or along a locus convex to the image side, or is configured to monotonically move to the object side.

Alternatively, the rear lens group LR consists of, in order from the object side to the image side, the third lens unit L3 having a positive refractive power, a fourth lens unit L4 having a positive refractive power, a fifth lens unit L5 having a negative refractive power, and a sixth lens unit L6 having a positive refractive power. Further, all of the lens units are configured to move to the object side during zooming from the wide angle end to the telephoto end. Still alternatively, the rear lens group LR consists of the third lens unit L3 having a positive refractive power and the fourth lens unit L4 having a negative refractive power. Further, all of the lens units are configured to move to the object side during zooming from the wide angle end to the telephoto end.

In the following, a lens configuration of each of Embodiments is described. The zoom lens of Embodiment 1 includes, in order from the object side to the image side, the first lens unit L1 having a positive refractive power, the second lens unit L2 having a negative refractive power, and the rear lens group LR including at least two lens units. The rear lens group LR consists of, in order from the object side to the image side, the third lens unit L3 having a positive refractive power, the fourth lens unit L4 having a negative refractive power, and the fifth lens unit L5 having a positive refractive power. The zoom lens of Embodiment 1 is a five-unit zoom lens having a zoom ratio of 12. The rear lens group LR has a positive refractive power over the entire zoom range.

During zooming from the wide angle end to the telephoto end, the second lens unit L2 is configured to move to the object side along the convex locus, and the first lens unit L1, the third lens unit L3, the fourth lens unit L4, and the fifth lens unit L5 are configured to move to the object side. At this time, an interval between the first lens unit L1 and the second lens unit L2 is wider and an interval between the second lens unit L2 and the third lens unit L3 is narrower at the telephoto end than at the wide angle end. Each of the lens units is configured to move so that an interval between the third lens unit L3 and the fourth lens unit L4 is wider and an interval between the fourth lens unit L4 and the fifth lens unit L5 is narrower at the telephoto end than at the wide angle end.

The second lens unit L2 includes four negative lenses and two positive lenses. Specifically, the second lens unit L2 includes, in order from the object side to the image side, negative, negative, negative, positive, negative, and positive lenses arranged in the stated order. Both surfaces of the negative lens G2a that is a first lens counted from the object side have an aspherical shape, and the object-side surface of the negative lens G2b that is a second lens counted from the object side has an aspherical shape. Those three aspherical surfaces having an aspherical shape are, in order from the object side to the image side, a first aspherical surface having a positive aspherical surface amount, a second aspherical surface having a negative aspherical surface amount, and a third aspherical surface having a positive aspherical surface amount. With this, distortion and astigmatism are satisfactorily corrected over the entire zoom range.

Moreover, a position of the third aspherical surface in the optical axis direction satisfies Conditional Expression (1), and hence distortion is effectively corrected. Moreover, powers (refractive powers) of the first lens unit L1 and the second lens unit L2 satisfy Conditional Expressions (2) and (3), and hence high optical performance is obtained while downsizing the zoom lens.

The zoom lens of Embodiment 2 is the same as that of Embodiment 1 in number of lens units, refractive powers of the respective lens units, and the like. The zoom lens of Embodiment 2 is a five-unit zoom lens having a zoom ratio of 12. The rear lens group LR has a positive refractive power over the entire zoom range. During zooming from the wide angle end to the telephoto end, the second lens unit L2 is configured to move along a locus convex to the image side, and the first lens unit L1, the third lens unit L3, the fourth lens unit L4, and the fifth lens unit L5 are configured to move to the object side.

At this time, the interval between the first lens unit L1 and the second lens unit L2 is wider and the interval between the second lens unit L2 and the third lens unit L3 is narrower at the telephoto end than at the wide angle end. Each of the lens units is configured to move so that the interval between the third lens unit L3 and the fourth lens unit L4 is wider and the interval between the fourth lens unit L4 and the fifth lens unit L5 is narrower at the telephoto end than at the wide angle end. The second lens unit L2 includes three negative lenses and three positive lenses. Specifically, the second lens unit L2 includes, in order from the object side to the image side, negative, negative, positive, positive, negative, and positive lenses arranged in the stated order.

Both surfaces of the negative lens G2a that is a first lens counted from the object side have an aspherical shape, and the object-side surface of the negative lens G2b that is a second lens counted from the object side has an aspherical shape. Those three aspherical surfaces having an aspherical shape are, in order from the object side to the image side, a first aspherical surface having a positive aspherical surface amount, a second aspherical surface having a negative aspherical surface amount, and a third aspherical surface having a positive aspherical surface amount. With this, distortion and astigmatism are satisfactorily corrected over the entire zoom range.

Moreover, a position of the third aspherical surface in the optical axis direction satisfies Conditional Expression (1), and hence distortion is effectively corrected. Moreover, powers of the first lens unit L1 and the second lens unit L2 satisfy Conditional Expressions (2) and (3), and hence high optical performance is obtained while downsizing the zoom lens.

The zoom lens of Embodiment 3 is the same as that of Embodiment 1 in number of lens units, refractive powers of the respective lens units, and the like. The zoom lens of Embodiment 3 is a five-unit zoom lens having a zoom ratio of 12. The rear lens group LR has a positive refractive power over the entire zoom range. During zooming from the wide angle end to the telephoto end, all of the lens units are configured to move to the object side. At this time, the interval between the first lens unit L1 and the second lens unit L2 is wider and the interval between the second lens unit L2 and the third lens unit L3 is narrower at the telephoto end than at the wide angle end. Each of the lens units is configured to move so that the interval between the third lens unit L3 and the fourth lens unit L4 is wider and the interval between the fourth lens unit L4 and the fifth lens unit L5 is narrower at the telephoto end than at the wide angle end.

The second lens unit L2 includes four negative lenses and two positive lenses. Specifically, the second lens unit L2 includes, in order from the object side to the image side, negative, negative, negative, positive, negative, and positive lenses arranged in the stated order. Both surfaces of the negative lens G2a that is a first lens counted from the object side have an aspherical shape, and the object-side surface of the negative lens G2b that is a second lens counted from the object side has an aspherical shape. Those three aspherical surfaces having an aspherical shape are, in order from the object side to the image side, a first aspherical surface having a positive aspherical surface amount, a second aspherical surface having a negative aspherical surface amount, and a third aspherical surface having a positive aspherical surface amount. With this, distortion and astigmatism are satisfactorily corrected over the entire zoom range.

Moreover, a position of the third aspherical surface in the optical axis direction satisfies Conditional Expression (1), and hence distortion is effectively corrected. Moreover, powers (refractive powers) of the first lens unit L1 and the second lens unit L2 satisfy Conditional Expressions (2) and (3), and hence high optical performance is obtained while downsizing the zoom lens.

The zoom lens of Embodiment 4 is the same as that of Embodiment 1 in number of lens units, refractive powers of the respective lens units, and the like. The zoom lens of Embodiment 4 is a five-unit zoom lens having a zoom ratio of 12. The rear lens group LR has a positive refractive power over the entire zoom range. During zooming from the wide angle end to the telephoto end, all of the lens units are configured to move to the object side. At this time, the interval between the first lens unit L1 and the second lens unit L2 is wider and the interval between the second lens unit L2 and the third lens unit L3 is narrower at the telephoto end than at the wide angle end. Each of the lens units is configured to move so that the interval between the third lens unit L3 and the fourth lens unit L4 is wider and the interval between the fourth lens unit L4 and the fifth lens unit L5 is narrower at the telephoto end than at the wide angle end.

The second lens unit L2 includes three negative lenses and three positive lenses. Specifically, the second lens unit L2 includes, in order from the object side to the image side, negative, negative, positive, positive, negative, and positive lenses arranged in the stated order. Both surfaces of the negative lens G2a that is a first lens counted from the object side have an aspherical shape, and the object-side surface of the negative lens G2b that is a second lens counted from the object side has an aspherical shape. Those three aspherical surfaces having an aspherical shape are, in order from the object side to the image side, a first aspherical surface having a positive aspherical surface amount, a second aspherical surface having a negative aspherical surface amount, and a third aspherical surface having a positive aspherical surface amount. With this, distortion and astigmatism are satisfactorily corrected over the entire zoom range.

Moreover, a position of the third aspherical surface in the optical axis direction satisfies Conditional Expression (1), and hence distortion is effectively corrected. Moreover, powers of the first lens unit L1 and the second lens unit L2 satisfy Conditional Expressions (2) and (3), and hence high optical performance is obtained while downsizing the zoom lens.

The zoom lens of Embodiment 5 includes, in order from the object side to the image side, the first lens unit L1 having a positive refractive power, the second lens unit L2 having a negative refractive power, and the rear lens group LR including at least two lens units. The rear lens group LR consists of, in order from the object side to the image side, the third lens unit L3 having a positive refractive power, the fourth lens unit L4 having a positive refractive power, the fifth lens unit L5 having a negative refractive power, and the sixth lens unit L6 having a positive refractive power. The zoom lens of Embodiment 5 is a six-unit zoom lens having a zoom ratio of 12. The rear lens group LR has a positive refractive power over the entire zoom range. All of the lens units are configured to move to the object side during zooming from the wide angle end to the telephoto end.

At this time, the interval between the first lens unit L1 and the second lens unit L2 is wider and the interval between the second lens unit L2 and the third lens unit L3 is narrower at the telephoto end than at the wide angle end. Each of the lens units is configured to move so that the interval between the third lens unit L3 and the fourth lens unit L4 is narrower, the interval between the fourth lens unit L4 and the fifth lens unit L5 is wider, and the interval between the fifth lens unit L5 and the sixth lens unit L6 is narrower at the telephoto end than at the wide angle end. The second lens unit L2 includes four negative lenses and two positive lenses. Specifically, the second lens unit L2 includes, in order from the object side to the image side, negative, negative, negative, positive, negative, and positive lenses arranged in the stated order.

Both surfaces of the negative lens G2a that is a first lens counted from the object side have an aspherical shape, and the object-side surface of the negative lens G2b that is a third lens counted from the object side has an aspherical shape. Those three aspherical surfaces having an aspherical shape are, in order from the object side to the image side, a first aspherical surface having a positive aspherical surface amount, a second aspherical surface having a negative aspherical surface amount, and a third aspherical surface having a positive aspherical surface amount. With this, distortion and astigmatism are satisfactorily corrected over the entire zoom range.

Moreover, a position of the third aspherical surface in the optical axis direction satisfies Conditional Expression (1), and hence distortion is effectively corrected. Moreover, powers (refractive powers) of the first lens unit L1 and the second lens unit L2 satisfy Conditional Expressions (2) and (3), and hence high optical performance is obtained while downsizing the zoom lens.

The zoom lens of Embodiment 6 includes, in order from the object side to the image side, the first lens unit L1 having a positive refractive power, the second lens unit L2 having a negative refractive power, and the rear lens group LR including at least two lens units. The rear lens group LR consists of, in order from the object side to the image side, the third lens unit L3 having a positive refractive power and the fourth lens unit L4 having a negative refractive power.

The zoom lens of Embodiment 6 is a four-unit zoom lens having a zoom ratio of 8.2. The rear lens group LR has a positive refractive power over the entire zoom range.

All of the lens units are configured to move to the object side during zooming from the wide angle end to the telephoto end. At this time, the interval between the first lens unit L1 and the second lens unit L2 is wider and the interval between the second lens unit L2 and the third lens unit L3 is narrower at the telephoto end than at the wide angle end. Each of the lens units is configured to move so that the interval between the third lens unit L3 and the fourth lens unit L4 is wider at the telephoto end than at the wide angle end. The second lens unit L2 includes four negative lenses and two positive lenses. Specifically, the second lens unit L2 includes, in order from the object side to the image side, negative, negative, negative, positive, negative, and positive lenses arranged in the stated order.

Both surfaces of the negative lens G2a that is a first lens counted from the object side have an aspherical shape, and the object-side surface of the negative lens G2b that is a third lens counted from the object side has an aspherical shape. Those three aspherical surfaces having an aspherical shape are, in order from the object side to the image side, a first aspherical surface having a positive aspherical surface amount, a second aspherical surface having a negative aspherical surface amount, and a third aspherical surface having a positive aspherical surface amount. With this, distortion and astigmatism are satisfactorily corrected over the entire zoom range.

Moreover, a position of the third aspherical surface in the optical axis direction satisfies Conditional Expression (1), and hence distortion is effectively corrected. Moreover, powers (refractive powers) of the first lens unit L1 and the second lens unit L2 satisfy Conditional Expressions (2) and (3), and hence high optical performance is obtained while downsizing the zoom lens.

The exemplary Embodiments of the zoom lens of the present invention are described above, but it is to be understood that the present invention is not limited to those Embodiments, and various modifications and changes can be made within the scope of the spirit thereof.

Next, Numerical Embodiments corresponding to the respective Embodiments of the present invention are described. In each Numerical Embodiment, i represents an order of a surface from the object side, ri represents a curvature radius of the lens surface, di represents a lens thickness and an air distance between the i-th surface and the (i+1)th surface, and ndi and vdi respectively represent a refractive index and Abbe number with respect to the d-line. BF represents back focus, which is represented by a distance from the last lens surface to the image plane. The total lens length is a distance from the first lens surface to the image plane. An aspherical shape is expressed by the following expression. In the following expression, the X axis corresponds to the optical axis direction, the H axis corresponds to the direction perpendicular to the optical axis, the light propagation direction is positive, R represents a paraxial curvature radius, K represents a conic constant, and A4, A6, A8, and A10 each represent an aspherical coefficient.

$$X = \frac{(1/R)H^2}{1+\sqrt{1-(1+K)(H/R)^2}} + A4 \times H^4 + A6 \times H^6 + A8 \times H^8 + A10 \times H^{10}$$

In addition, [e+X] means [×10$^{+x}$], and [e−X] means [×10$^{-x}$]. The aspherical surface is indicated by adding * as a suffix to a surface number. In addition, the part where an interval d between optical surfaces is "(variable)" is changed during zooming, and the interval between surfaces corresponding to the focal length is shown in an annexed table. In addition, the part where an effective diameter of each optical surface is "(variable)" is changed during zooming. The effective diameter corresponding to the focal length is shown in an annexed table in which a variable surface number is represented by "eai". In addition, a relationship between the parameters and conditional expressions described above and each of the Numerical Embodiments are shown in Table 1.

In Table 1,

Ar11, Ea11, and Asp1 represent an aspherical surface amount, an effective diameter, and Conditional Expression (xa) of the first aspherical surface, respectively, Ar12, Ea12, and Asp2 represent an aspherical surface amount, an effective diameter, and Conditional Expression (xb) of the second aspherical surface, respectively, and Ar21, Ea21, and Asp3 represent an aspherical surface amount, an effective diameter, and Conditional Expression (xa) of the third aspherical surface, respectively.

Numerical Embodiment 1
Unit mm

Surface data

| Surface number | r | d | nd | vd | Effective diameter |
|---|---|---|---|---|---|
| 1 | 262.675 | 2.00 | 1.88300 | 40.8 | 65.82 |
| 2 | 86.266 | 9.15 | 1.49700 | 81.5 | 60.83 |
| 3 | −448.626 | 0.15 | | | 60.66 |
| 4 | 83.266 | 6.85 | 1.59522 | 67.7 | 59.96 |
| 5 | 829.784 | (Variable) | | | 59.38 |
| 6* | ∞ | 1.60 | 1.85400 | 40.4 | 33.56 |
| 7* | 22.011 | 4.47 | | | 26.11 |
| 8* | 134.326 | 1.40 | 1.77250 | 49.6 | 25.81 |
| 9 | 48.634 | 2.27 | | | 24.38 |
| 10 | −118.847 | 1.20 | 1.76385 | 48.5 | 24.31 |
| 11 | 49.293 | 4.06 | 1.72047 | 34.7 | 23.31 |
| 12 | −57.532 | 2.17 | | | 23.33 |
| 13 | −21.928 | 1.20 | 1.59522 | 67.7 | 23.32 |
| 14 | −116.471 | 0.15 | | | 24.75 |
| 15 | 186.806 | 3.04 | 1.85478 | 24.8 | 26.17 |
| 16 | −77.228 | (Variable) | | | 26.84 |
| 17 (Variable stop) | ∞ | (Variable) | | | (Variable) |
| 18 (Stop) | ∞ | (Variable) | | | 28.80 |
| 19 | 63.157 | 2.79 | 1.68893 | 31.1 | 29.44 |
| 20 | 202.862 | 0.15 | | | 29.65 |
| 21 | 45.469 | 3.96 | 1.59522 | 67.7 | 30.38 |
| 22 | 474.814 | 0.15 | | | 30.27 |
| 23 | 40.003 | 5.16 | 1.48749 | 70.2 | 30.08 |
| 24 | −247.814 | 1.50 | 2.00100 | 29.1 | 29.53 |
| 25 | 260.527 | 0.15 | | | 29.08 |
| 26 | 37.940 | 1.50 | 2.00100 | 29.1 | 28.39 |
| 27 | 18.728 | 7.67 | 1.58313 | 59.4 | 26.20 |
| 28* | −114.480 | (Variable) | | | 25.83 |
| 29* | −110.893 | 1.10 | 1.85400 | 40.4 | 20.28 |
| 30 | 109.268 | 1.00 | | | 20.29 |
| 31 | −156.672 | 1.10 | 1.88300 | 40.8 | 20.33 |
| 32 | 25.208 | 3.36 | 1.84666 | 23.8 | 20.98 |
| 33 | 196.182 | (Variable) | | | 21.25 |
| 34 | 43.435 | 6.52 | 1.59522 | 67.7 | 30.01 |
| 35 | −69.776 | 0.15 | | | 30.13 |
| 36 | 87.533 | 1.40 | 2.00100 | 29.1 | 29.59 |
| 37 | 22.893 | 5.63 | 1.43875 | 94.9 | 28.29 |
| 38 | 36.202 | 1.06 | | | 29.25 |

Numerical Embodiment 1
Unit mm

| | | | | | |
|---|---|---|---|---|---|
| 39 | 37.270 | 7.43 | 1.64769 | 33.8 | 30.32 |
| 40 | −65.462 | 2.48 | | | 30.56 |
| 41 | −29.375 | 1.60 | 1.88300 | 40.8 | 30.56 |
| 42 | −47.471 | | | | 32.02 |

Aspherical surface data

Sixth surface

K = 0.00000e+000 A4 = 1.86620e−005 A6 = −3.04876e−008
A8 = 1.60015e−011 A10 = −6.99764e−015
Seventh surface K = 0.00000e+000 A4 = 8.50229e−006 A6 = 4.56149e−008
A8 = −6.92293e−011 A10 = 1.18149e−012
Eighth surface K = 0.00000e+000 A4 = −4.19520e−006 A6 = 2.70106e−008
A8 = 1.21290e−010 A10 = 2.28500e−013
Twenty-eighth surface K = 0.00000e+000 A4 = 8.33882e−006 A6 = −1.20374e−008
A8 = 2.87452e−011 A10 = −5.98571e−014
Twenty-ninth surface K = 0.00000e+000 A4 = 4.12934e−006 A6 = −1.25462e−008
A8 = 7.22837e−011 A10 = −1.38628e−013

Various data
Zoom ratio 12.14

| | Wide angle | Intermediate | Telephoto |
|---|---|---|---|
| Focal length | 24.30 | 99.98 | 294.95 |
| F-number | 4.10 | 5.76 | 5.88 |
| Half angle of field (degree) | 41.68 | 12.21 | 4.20 |
| Image height | 21.64 | 21.64 | 21.64 |
| Total lens length | 197.38 | 245.98 | 298.53 |
| BF | 38.90 | 91.95 | 92.55 |
| d5 | 2.33 | 32.83 | 93.55 |
| d16 | 17.22 | 9.20 | 0.50 |
| d17 | 18.00 | 1.08 | 1.00 |
| d18 | 10.00 | 0.00 | 0.00 |
| d28 | 1.25 | 12.04 | 14.34 |
| d33 | 14.09 | 3.30 | 1.00 |
| ea17 | 13.60 | 27.14 | 27.81 |

Zoom lens unit data

| Unit | First surface | Focal length | Lens structure length | Front principal point position | Rear principal point position |
|---|---|---|---|---|---|
| 1 | 1 | 154.14 | 18.15 | 7.34 | −4.27 |
| 2 | 6 | −20.26 | 21.56 | 1.16 | −15.77 |
| 3 | 17 | ∞ | 0.00 | 0.00 | −0.00 |
| 4 | 18 | ∞ | 0.00 | 0.00 | −0.00 |
| 5 | 19 | 30.36 | 23.04 | 3.34 | −11.65 |
| 6 | 29 | −36.46 | 6.56 | 1.25 | −2.70 |
| 7 | 34 | 71.55 | 26.28 | 0.46 | −17.34 |

Numerical Embodiment 2
Unit mm

Surface data

| Surface number | r | d | nd | vd | Effective diameter |
|---|---|---|---|---|---|
| 1 | 282.762 | 2.00 | 1.83481 | 42.7 | 66.04 |
| 2 | 81.668 | 8.92 | 1.49700 | 81.5 | 60.46 |
| 3 | −586.894 | 0.15 | | | 58.86 |
| 4 | 82.401 | 6.59 | 1.59522 | 67.7 | 57.64 |
| 5 | 1,002.091 | (Variable) | | | 57.02 |
| 6* | −118.848 | 1.60 | 1.88300 | 40.8 | 36.16 |
| 7* | 24.522 | 7.53 | | | 27.87 |
| 8* | −41.458 | 1.30 | 1.88300 | 40.8 | 27.69 |
| 9 | 69.724 | 3.09 | 1.85478 | 24.8 | 27.20 |
| 10 | −361.767 | 0.15 | | | 27.06 |
| 11 | 1,189.953 | 4.16 | 1.72047 | 34.7 | 26.94 |
| 12 | −35.865 | 1.86 | | | 26.73 |
| 13 | −22.324 | 1.20 | 1.59522 | 67.7 | 26.73 |
| 14 | −55.563 | 0.15 | | | 27.64 |
| 15 | 624.717 | 2.81 | 1.80000 | 29.8 | 29.45 |
| 16 | −100.191 | (Variable) | | | 30.10 |
| 17 (Variable stop) | ∞ | (Variable) | | | (Variable) |
| 18 (Stop) | ∞ | (Variable) | | | 30.98 |
| 19 | 79.830 | 4.71 | 1.51633 | 64.1 | 32.42 |
| 20 | −92.794 | 0.15 | | | 32.73 |
| 21 | 65.500 | 6.86 | 1.51823 | 58.9 | 33.15 |
| 22 | −47.641 | 1.50 | 2.00100 | 29.1 | 32.96 |
| 23 | −96.955 | 0.15 | | | 33.25 |
| 24 | 38.719 | 1.50 | 1.90366 | 31.3 | 32.47 |
| 25 | 23.224 | 8.29 | 1.58313 | 59.4 | 30.60 |
| 26* | −131.543 | (Variable) | | | 30.09 |
| 27 | −852.531 | 1.10 | 1.88300 | 40.8 | 23.85 |
| 28 | 81.384 | 1.76 | | | 23.28 |
| 29 | −73.777 | 1.10 | 1.88300 | 40.8 | 23.28 |
| 30 | 61.571 | 4.15 | 1.84666 | 23.8 | 23.29 |
| 31 | −45.255 | 0.42 | | | 23.48 |
| 32 | −70.767 | 1.10 | 1.88300 | 40.8 | 23.39 |
| 33 | 96.236 | (Variable) | | | 23.68 |
| 34 | 94.091 | 6.36 | 1.49700 | 81.5 | 36.00 |
| 35 | −69.283 | 0.15 | | | 36.35 |
| 36 | 67.608 | 1.90 | 2.00100 | 29.1 | 36.18 |
| 37 | 30.690 | 8.66 | 1.59522 | 67.7 | 34.77 |
| 38 | −226.494 | 0.15 | | | 34.69 |
| 39 | 150.720 | 1.80 | 1.90366 | 31.3 | 34.43 |
| 40 | 23.257 | 11.35 | 1.68893 | 31.1 | 33.02 |
| 41 | −74.361 | 1.01 | | | 33.13 |
| 42 | −49.134 | 1.80 | 1.88300 | 40.8 | 33.13 |
| 43 | −197.633 | | | | 33.94 |

Aspherical surface data

Sixth surface

K = 0.00000e+000 A4 = 2.32893e−005 A6 = −4.11485e−008
A8 = 7.29666e−011 A10 = −6.50838e−014
Seventh surface K = 0.00000e+000 A4 = 7.30571e−006 A6 = 3.37954e−008
A8 = −2.01056e−010 A10 = 1.15910e−012
Eighth surface K = 0.00000e+000 A4 = −4.67021e−006 A6 = 8.01979e−009
A8 = 2.22302e−011 A10 = 1.40305e−013
Twenty-sixth surface K = 0.00000e+000 A4 = 2.72281e−006 A6 = −3.68196e−009
A8 = 1.11205e−011 A10 = −2.32863e−014

Various data
Zoom ratio 12.14

| | Wide angle | Intermediate | Telephoto |
|---|---|---|---|
| Focal length | 24.30 | 99.99 | 294.97 |
| F-number | 4.10 | 5.53 | 5.93 |
| Half angle of field (degree) | 41.68 | 12.21 | 4.19 |
| Image height | 21.64 | 21.64 | 21.64 |
| Total lens length | 238.52 | 260.98 | 316.46 |
| BF | 38.90 | 92.94 | 101.87 |
| d5 | 2.74 | 35.01 | 94.48 |
| d16 | 25.02 | 10.10 | 0.50 |
| d17 | 10.50 | 0.50 | 0.50 |

Numerical Embodiment 2
Unit mm

| | | | |
|---|---|---|---|
| d18 | 25.99 | 1.72 | 0.50 |
| d26 | 0.80 | 9.04 | 10.11 |
| d33 | 27.07 | 4.17 | 1.00 |
| ea17 | 15.54 | 29.57 | 30.98 |

Zoom lens unit data

| Unit | First surface | Focal length | Lens structure length | Front principal point position | Rear principal point position |
|---|---|---|---|---|---|
| 1 | 1 | 157.46 | 17.66 | 7.41 | −3.91 |
| 2 | 6 | −22.71 | 23.85 | −0.80 | −20.62 |
| 3 | 17 | ∞ | 0.00 | 0.00 | −0.00 |
| 4 | 18 | ∞ | 0.00 | 0.00 | −0.00 |
| 5 | 19 | 31.60 | 23.17 | 5.88 | −9.57 |
| 6 | 27 | −35.62 | 9.63 | 2.34 | −3.69 |
| 7 | 34 | 91.89 | 33.18 | −6.59 | −24.90 |

Numerical Embodiment 3
Unit mm

Surface data

| Surface number | r | d | nd | vd | Effective diameter |
|---|---|---|---|---|---|
| 1 | 191.882 | 2.00 | 1.88300 | 40.8 | 64.63 |
| 2 | 75.995 | 8.76 | 1.49700 | 81.5 | 59.36 |
| 3 | −1,228.861 | 0.15 | | | 58.91 |
| 4 | 76.799 | 6.89 | 1.59522 | 67.7 | 57.64 |
| 5 | 799.157 | (Variable) | | | 56.95 |
| 6* | ∞ | 1.60 | 1.85400 | 40.4 | 33.92 |
| 7* | 21.496 | 4.93 | | | 25.98 |
| 8* | 405.002 | 1.50 | 1.77250 | 49.6 | 25.90 |
| 9 | 57.464 | 3.40 | | | 24.74 |
| 10 | −41.743 | 1.20 | 1.77250 | 49.6 | 24.61 |
| 11 | 423.803 | 3.85 | 1.72047 | 34.7 | 24.36 |
| 12 | −33.472 | 1.69 | | | 24.24 |
| 13 | −20.528 | 1.20 | 1.59522 | 67.7 | 24.24 |
| 14 | −65.604 | 0.15 | | | 25.88 |
| 15 | 511.857 | 3.08 | 1.85478 | 24.8 | 27.69 |
| 16 | −68.491 | (Variable) | | | 28.41 |
| 17 (Variable stop) | ∞ | (Variable) | | | (Variable) |
| 18 (Stop) | ∞ | 0.00 | | | 29.88 |
| 19 | 64.899 | 5.20 | 1.58913 | 61.1 | 31.69 |
| 20 | −78.082 | 0.15 | | | 31.97 |
| 21 | 90.708 | 6.22 | 1.56384 | 60.7 | 32.06 |
| 22 | −43.315 | 1.50 | 2.00100 | 29.1 | 31.87 |
| 23 | −117.956 | 0.15 | | | 32.17 |
| 24 | 31.690 | 1.50 | 1.90366 | 31.3 | 31.62 |
| 25 | 19.753 | 9.51 | 1.58313 | 59.4 | 29.40 |
| 26* | −120.893 | (Variable) | | | 28.73 |
| 27 | −95.932 | 1.10 | 1.88300 | 40.8 | 24.59 |
| 28 | 44.658 | 5.08 | 1.84666 | 23.8 | 23.97 |
| 29 | −39.030 | 1.10 | 1.85400 | 40.4 | 23.70 |
| 30* | 41.088 | (Variable) | | | 22.99 |
| 31 | 33.917 | 6.10 | 1.59522 | 67.7 | 26.88 |
| 32 | −64.096 | 0.15 | | | 26.88 |
| 33 | 134.924 | 1.30 | 2.00100 | 29.1 | 26.31 |
| 34 | 17.819 | 11.17 | 1.60342 | 38.0 | 25.01 |
| 35 | −28.425 | 0.73 | | | 25.63 |
| 36 | −23.591 | 1.40 | 1.88300 | 40.8 | 25.62 |
| 37 | −56.257 | | | | 27.38 |

Aspherical surface data

Sixth surface

K = 0.00000e+000 A4 = 2.15641e−005 A6 = −1.59405e−008
A8 = −1.70228e−010 A10 = 3.04762e−013

Seventh surface

K = 0.00000e+000 A4 = 1.89375e−005 A6 = 1.10852e−007
A8 = −7.63747e−011 A10 = 1.49508e−012

Eighth surface

K = 0.00000e+000 A4 = 2.71002e−006 A6 = 5.16814e−008
A8 = 2.76700e−010 A10 = 7.67569e−013

Twenty-sixth surface

K = 0.00000e+000 A4 = 5.01527e−006 A6 = −1.02262e−008
A8 = 1.27987e−011 A10 = −1.36611e−014

Thirtieth surface

K = 0.00000e+000 A4 = −6.88605e−006 A6 = 6.23774e−010
A8 = 3.09305e−011 A10 = −1.47376e−013

Various data
Zoom ratio 12.14

| | Wide angle | Intermediate | Telephoto |
|---|---|---|---|
| Focal length | 24.30 | 100.00 | 294.99 |
| F-number | 4.10 | 5.66 | 5.99 |
| Half angle of field (degree) | 41.68 | 12.21 | 4.19 |
| Image height | 21.64 | 21.64 | 21.64 |
| Total lens length | 196.23 | 246.15 | 298.43 |
| BF | 38.91 | 98.09 | 109.87 |
| d5 | 2.23 | 35.29 | 86.36 |
| d16 | 22.86 | 1.23 | 1.00 |
| d17 | 20.48 | 9.43 | 1.00 |
| d26 | 1.41 | 6.22 | 6.44 |
| d30 | 17.58 | 3.14 | 1.00 |
| ea17 | 15.77 | 23.49 | 29.88 |

Zoom lens unit data

| Unit | First surface | Focal length | Lens structure length | Front principal point position | Rear principal point position |
|---|---|---|---|---|---|
| 1 | 1 | 143.57 | 17.80 | 6.33 | −5.09 |
| 2 | 6 | −19.46 | 22.59 | 0.78 | −18.07 |
| 3 | 17 | ∞ | 0.00 | 0.00 | −0.00 |
| 4 | 19 | 28.41 | 24.23 | 5.64 | −10.33 |
| 5 | 27 | −31.43 | 7.28 | 2.60 | −1.23 |
| 6 | 31 | 77.39 | 20.85 | −3.18 | −15.83 |

Numerical Embodiment 4
Unit mm

Surface data

| Surface number | r | d | nd | vd | Effective diameter |
|---|---|---|---|---|---|
| 1 | 227.782 | 2.00 | 1.88300 | 40.8 | 65.30 |
| 2 | 80.810 | 8.74 | 1.49700 | 81.5 | 60.06 |
| 3 | −754.473 | 0.15 | | | 58.94 |
| 4 | 82.226 | 6.67 | 1.59522 | 67.7 | 57.69 |
| 5 | 1,213.652 | (Variable) | | | 57.01 |
| 6* | −1,923.842 | 1.60 | 1.85400 | 40.4 | 34.85 |
| 7* | 20.809 | 7.07 | | | 26.66 |
| 8* | −51.953 | 1.30 | 1.85400 | 40.4 | 26.46 |
| 9 | 33.332 | 3.70 | 1.85478 | 24.8 | 25.18 |
| 10 | 460.674 | 0.15 | | | 24.85 |
| 11 | 1,832.726 | 3.45 | 1.72047 | 34.7 | 24.84 |
| 12 | −38.450 | 1.54 | | | 24.52 |
| 13 | −22.981 | 1.20 | 1.59522 | 67.7 | 24.52 |
| 14 | −125.245 | 0.15 | | | 26.68 |
| 15 | 150.623 | 2.80 | 1.80000 | 29.8 | 28.35 |
| 16 | −143.898 | (Variable) | | | 28.98 |
| 17 (Variable stop) | ∞ | (Variable) | | | (Variable) |

-continued

Numerical Embodiment 4
Unit mm

| | | | | |
|---|---|---|---|---|
| 18 (Stop) | ∞ | 0.00 | | 30.20 |
| 19 | 74.960 | 3.38 | 1.63854 55.4 | 31.56 |
| 20 | −1,029.641 | 0.15 | | 31.88 |
| 21 | 56.773 | 3.46 | 1.59522 67.7 | 32.73 |
| 22 | 256.437 | 0.15 | | 32.68 |
| 23 | 40.411 | 5.98 | 1.51742 52.4 | 32.76 |
| 24 | −160.442 | 1.50 | 2.00100 29.1 | 32.28 |
| 25 | 635.862 | 0.15 | | 31.87 |
| 26 | 36.464 | 1.50 | 2.00100 29.1 | 30.94 |
| 27 | 19.249 | 8.55 | 1.58313 59.4 | 28.38 |
| 28* | −110.217 | (Variable) | | 27.99 |
| 29 | −1,128.192 | 1.10 | 1.88300 40.8 | 20.93 |
| 30 | 98.181 | 0.95 | | 20.61 |
| 31 | −127.544 | 1.10 | 1.88300 40.8 | 20.61 |
| 32 | 22.320 | 3.36 | 1.84666 23.8 | 20.69 |
| 33* | 91.124 | (Variable) | | 20.83 |
| 34 | 47.777 | 5.76 | 1.49700 81.5 | 26.33 |
| 35 | −52.463 | 0.15 | | 26.56 |
| 36 | 96.080 | 1.30 | 2.00100 29.1 | 26.43 |
| 37 | 21.618 | 4.41 | 1.49700 81.5 | 25.68 |
| 38 | 37.474 | 1.47 | | 26.44 |
| 39 | 38.163 | 6.93 | 1.69895 30.1 | 28.14 |
| 40 | −62.571 | 1.84 | | 28.51 |
| 41 | −30.876 | 1.50 | 1.88300 40.8 | 28.51 |
| 42 | −56.114 | | | 29.79 |

Aspherical surface data

Sixth surface

K = 0.00000e+000 A4 = 1.79515e−005 A6 = −4.32442e−008
A8 = 8.79878e−011 A10 = −7.98746e−014
Seventh surface K = 0.00000e+000 A4 = 6.54163e−006 A6 = 4.63763e−009
A8 = −6.77907e−011 A10 = 8.00478e−013
Eighth surface K = 0.00000e+000 A4 = −3.12178e−006 A6 = 2.99486e−009
A8 = 8.37239e−011 A10 = −1.35083e−013
Twenty-eighth surface K = 0.00000e+000 A4 = 7.04783e−006 A6 = −9.97816e−009
A8 = 1.78001e−011 A10 = −4.22406e−014
Thirty-third surface K = 0.00000e+000 A4 = −4.31898e−006 A6 = 1.01275e−008
A8 = −6.15621e−011 A10 = 1.15671e−013

Various data
Zoom ratio 12.14

| | Wide angle | Intermediate | Telephoto |
|---|---|---|---|
| Focal length | 24.30 | 100.00 | 294.99 |
| F-number | 4.10 | 5.60 | 5.89 |
| Half angle of field (degree) | 41.68 | 12.21 | 4.19 |
| Image height | 21.64 | 21.64 | 21.64 |
| Total lens length | 197.97 | 242.42 | 298.48 |
| BF | 38.89 | 91.12 | 96.32 |
| d5 | 2.30 | 31.28 | 90.82 |
| d16 | 20.61 | 3.14 | 0.50 |
| d17 | 26.33 | 7.05 | 1.00 |
| d28 | 0.81 | 11.39 | 13.64 |
| d33 | 13.83 | 3.24 | 1.00 |
| ea17 | 14.73 | 25.38 | 29.63 |

Zoom lens unit data

| Unit | First surface | Focal length | Lens structure length | Front principal point position | Rear principal point position |
|---|---|---|---|---|---|
| 1 | 1 | 152.70 | 17.56 | 6.92 | −4.33 |
| 2 | 6 | −19.88 | 22.96 | 1.11 | −16.29 |
| 3 | 17 | ∞ | 0.00 | 0.00 | −0.00 |
| 4 | 18 | 29.42 | 24.81 | 4.41 | −11.90 |
| 5 | 29 | −35.44 | 6.52 | 2.00 | −1.88 |
| 6 | 34 | 87.58 | 23.36 | 1.20 | −14.67 |

Numerical Embodiment 5
Unit mm

Surface data

| Surface number | r | d | nd | vd | Effective diameter |
|---|---|---|---|---|---|
| 1 | 237.559 | 2.00 | 1.88300 | 40.8 | 65.47 |
| 2 | 84.179 | 9.23 | 1.49700 | 81.5 | 62.14 |
| 3 | −652.561 | 0.15 | | | 61.89 |
| 4 | 83.688 | 7.05 | 1.59522 | 67.7 | 60.95 |
| 5 | 933.296 | (Variable) | | | 60.29 |
| 6* | ∞ | 1.60 | 1.85400 | 40.4 | 33.95 |
| 7* | 21.193 | 5.45 | | | 26.10 |
| 8 | −277.277 | 1.40 | 1.77250 | 49.6 | 25.90 |
| 9 | 144.541 | 1.64 | | | 24.84 |
| 10* | −81.185 | 1.20 | 1.76385 | 48.5 | 24.75 |
| 11 | 96.300 | 3.60 | 1.72047 | 34.7 | 24.01 |
| 12 | −48.902 | 1.76 | | | 23.65 |
| 13 | −23.407 | 1.20 | 1.59522 | 67.7 | 23.65 |
| 14 | −137.459 | 0.15 | | | 24.70 |
| 15 | 151.600 | 2.96 | 1.85478 | 24.8 | 26.03 |
| 16 | −88.806 | (Variable) | | | 26.65 |
| 17 (Variable stop) | ∞ | (Variable) | | | (Variable) |
| 18 (Stop) | ∞ | (Variable) | | | 28.10 |
| 19 | 53.332 | 2.44 | 1.69895 | 30.1 | 29.34 |
| 20 | 90.359 | (Variable) | | | 29.48 |
| 21 | 41.807 | 4.62 | 1.59522 | 67.7 | 30.33 |
| 22 | −499.193 | 0.15 | | | 30.24 |
| 23 | 43.853 | 4.35 | 1.49700 | 81.5 | 29.90 |
| 24 | 1027.648 | 0.15 | | | 29.34 |
| 25* | 64.904 | 1.50 | 2.00100 | 29.1 | 28.69 |
| 26 | 22.379 | 6.84 | 1.56883 | 56.4 | 26.88 |
| 27 | −125.683 | (Variable) | | | 26.70 |
| 28 | −107.500 | 1.10 | 1.88300 | 40.8 | 22.14 |
| 29 | 41.771 | 0.15 | | | 22.33 |
| 30 | 36.244 | 3.57 | 1.85478 | 24.8 | 22.67 |
| 31 | −177.475 | 1.10 | 1.85400 | 40.8 | 22.76 |
| 32* | 52.720 | (Variable) | | | 22.74 |
| 33 | 57.220 | 6.58 | 1.59522 | 67.7 | 31.63 |
| 34 | −59.664 | 0.15 | | | 31.81 |
| 35 | 77.238 | 1.40 | 2.00100 | 29.1 | 31.02 |
| 36 | 21.153 | 5.17 | 1.43875 | 94.9 | 29.28 |
| 37 | 33.053 | 0.63 | | | 30.24 |
| 38 | 31.811 | 8.18 | 1.64769 | 33.8 | 31.73 |
| 39 | −82.357 | 1.88 | | | 31.93 |
| 40 | −38.721 | 1.60 | 1.88300 | 40.8 | 31.93 |
| 41 | −71.489 | | | | 33.02 |

Aspherical surface data

Sixth surface

K = 0.00000e+000 A4 = 1.94899e−005 A6 = −5.58353e−008
A8 = 1.46441e−010 A10 = −1.75111e−013
Seventh surface K = 0.00000e+000 A4 = 1.06964e−005 A6 = 5.77937e−009
A8 = −1.27014e−010 A10 = 1.53276e−012
Tenth surface K = 0.00000e+000 A4 = −3.46897e−006 A6 = 9.83790e−009
A8 = 6.81292e−012 A10 = 2.23747e−013
Twenty-fifth surface K = 0.00000e+000 A4 = −4.64496e−006 A6 = −3.41074e−010
A8 = −6.55903e−013 A10 = 1.21737e−015

Numerical Embodiment 5
Unit mm

Thirty-second surface

K = 0.00000e+000 A4 = −2.77060e−006 A6 = 5.17029e−009
A8 = −2.00629e−011 A10 = 6.45952e−014

Various data
Zoom ratio 12.14

|  | Wide angle | Intermediate | Telephoto |
|---|---|---|---|
| Focal length | 24.30 | 99.99 | 294.99 |
| F-number | 4.10 | 5.71 | 5.88 |
| Half angle of field (degree) | 41.68 | 12.21 | 4.19 |
| Image height | 21.64 | 21.64 | 21.64 |
| Total lens length | 198.55 | 245.71 | 298.53 |
| BF | 39.59 | 92.36 | 93.20 |
| d5 | 2.40 | 33.70 | 94.78 |
| d16 | 17.02 | 2.13 | 0.50 |
| d17 | 17.99 | 8.46 | 1.00 |
| d18 | 10.00 | 0.00 | 0.00 |
| d20 | 3.04 | 0.55 | 0.55 |
| d27 | 1.28 | 13.76 | 16.34 |
| d32 | 16.27 | 3.78 | 1.21 |
| ea17 | 13.35 | 23.06 | 27.40 |

Zoom lens unit data

| Unit | First surface | Focal length | Lens structure length | From principal point position | Rear principal point position |
|---|---|---|---|---|---|
| 1 | 1 | 155.88 | 18.44 | 7.17 | −4.64 |
| 2 | 6 | −20.75 | 20.96 | 0.85 | −15.81 |
| 3 | 17 | ∞ | 0.00 | 0.00 | −0.00 |
| 4 | 18 | ∞ | 0.00 | 0.00 | −0.00 |
| 5 | 19 | 181.31 | 2.44 | −2.01 | −3.41 |
| 6 | 21 | 37.97 | 17.61 | 1.86 | −9.61 |
| 7 | 28 | −44.99 | 5.92 | 2.14 | −1.06 |
| 8 | 33 | 81.73 | 25.60 | 0.12 | −16.62 |

Single lens data

| Lens | First surface | Focal length |
|---|---|---|
| 1 | 1 | −148.56 |
| 2 | 2 | 150.65 |
| 3 | 4 | 153.97 |
| 4 | 6 | −24.82 |
| 5 | 8 | −122.82 |
| 6 | 10 | −57.50 |
| 7 | 11 | 45.49 |
| 8 | 13 | −47.58 |
| 9 | 15 | 65.89 |
| 10 | 19 | 181.31 |
| 11 | 21 | 65.02 |
| 12 | 23 | 92.03 |
| 13 | 25 | −34.74 |
| 14 | 26 | 33.97 |
| 15 | 28 | −33.95 |
| 16 | 30 | 35.48 |
| 17 | 31 | −47.49 |
| 18 | 33 | 50.12 |
| 19 | 35 | −29.47 |
| 20 | 36 | 118.23 |
| 21 | 38 | 36.46 |
| 22 | 40 | −97.91 |

Numerical Embodiment 6
Unit mm

Surface data

| Surface number | r | d | nd | vd | Effective diameter |
|---|---|---|---|---|---|
| 1 | 195.304 | 2.00 | 1.88300 | 40.8 | 64.68 |
| 2 | 75.342 | 8.70 | 1.49700 | 81.5 | 59.33 |
| 3 | −1,857.425 | 0.15 |  |  | 57.57 |
| 4 | 75.332 | 6.55 | 1.59522 | 67.7 | 56.00 |
| 5 | 621.476 | (Variable) |  |  | 55.23 |
| 6* | ∞ | 1.60 | 1.85400 | 40.4 | 34.33 |
| 7* | 18.547 | 6.67 |  |  | 25.45 |
| 8 | −86.702 | 1.40 | 1.77250 | 49.6 | 25.26 |
| 9 | 563.073 | 0.80 |  |  | 24.40 |
| 10* | −237.385 | 1.20 | 1.76385 | 48.5 | 24.14 |
| 11 | 77.161 | 3.92 | 1.72047 | 34.7 | 23.35 |
| 12 | −52.932 | 2.39 |  |  | 22.74 |
| 13 | −19.676 | 1.20 | 1.59522 | 67.7 | 22.73 |
| 14 | −47.946 | 0.15 |  |  | 22.89 |
| 15 | 645.197 | 2.33 | 1.85478 | 24.8 | 24.15 |
| 16 | −83.375 | (Variable) |  |  | 24.72 |
| 17 (Variable stop) | ∞ | (Variable) |  |  | (Variable) |
| 18 (Stop) | ∞ | (Variable) |  |  | 28.00 |
| 19 | 51.609 | 2.82 | 1.84666 | 23.8 | 27.91 |
| 20 | 155.048 | 0.15 |  |  | 27.94 |
| 21 | 36.994 | 3.21 | 1.59522 | 67.7 | 28.38 |
| 22 | 55.429 | 7.70 |  |  | 27.97 |
| 23 | 25.925 | 5.94 | 1.49700 | 81.5 | 28.01 |
| 24 | 322.349 | 0.16 |  |  | 27.15 |
| 25* | 64.301 | 1.50 | 2.00100 | 29.1 | 26.54 |
| 26 | 19.210 | 6.30 | 1.51823 | 58.9 | 24.46 |
| 27 | −414.695 | 0.15 |  |  | 24.31 |
| 28 | 124.955 | 1.10 | 1.88300 | 40.8 | 24.23 |
| 29 | 46.143 | 11.84 |  |  | 23.98 |
| 30 | 50.342 | 3.92 | 1.83481 | 42.7 | 28.57 |
| 31 | −177.113 | (Variable) |  |  | 28.53 |
| 32 | −174.378 | 2.53 | 1.59522 | 67.7 | 27.98 |
| 33 | −109.846 | 0.15 |  |  | 27.91 |
| 34 | 239.360 | 1.40 | 2.00100 | 29.1 | 27.62 |
| 35 | 19.243 | 6.22 | 1.43875 | 94.9 | 26.60 |
| 36 | 75.243 | 1.01 |  |  | 28.00 |
| 37 | 72.960 | 10.80 | 1.72151 | 29.2 | 29.54 |
| 38 | −20.375 | 1.60 | 1.85400 | 40.4 | 30.57 |
| 39* | −71.171 |  |  |  | 33.70 |

Aspherical surface data

Sixth surface

K = 0.00000e+000 A4 = 2.25764e−005 A6 = −4.47930e−008
A8 = 8.47185e−011 A10 = −8.64622e−014

Seventh surface

K = 0.00000e+000 A4 = 6.39712e−006 A6 = 6.31243e−008
A8 = −3.24035e−010 A10 = 2.51381e−012

Tenth surface

K = 0.00000e+000 A4 = −1.33765e−006 A6 = 2.07345e−008
A8 = 4.46521e−011 A10 = 5.26572e−013

Twenty-fifth surface

K = 0.00000e+000 A4 = −6.42231e−006 A6 = 8.75690e−010
A8 = 1.00065e−013 A10 = 1.40496e−014

Thirty-ninth surface

K = 0.00000e+000 A4 = −5.02536e−006 A6 = −1.29460e−008
A8 = 2.87119e−011 A10 = −1.01104e−013

Various data
Zoom ratio 8.23

|  | Wide angle | Intermediate | Telephoto |
|---|---|---|---|
| Focal length | 24.30 | 99.97 | 199.91 |
| F-number | 4.10 | 5.71 | 5.88 |
| Half angle of field (degree) | 41.68 | 12.21 | 6.18 |
| Image height | 21.64 | 21.64 | 21.64 |
| Total lens length | 194.84 | 258.91 | 298.20 |

Numerical Embodiment 6
Unit mm

| | | | |
|---|---|---|---|
| BF | 39.58 | 91.95 | 92.00 |
| d5 | 2.25 | 36.62 | 77.96 |
| d16 | 16.45 | 4.77 | 0.51 |
| d17 | 14.00 | 2.34 | 1.00 |
| d18 | 14.00 | 0.00 | 0.00 |
| d31 | 1.00 | 15.89 | 19.20 |
| ea17 | 13.99 | 24.94 | 25.52 |

Zoom lens unit data

| Unit | First surface | Focal length | Lens structure length | Front principal point position | Rear principal point position |
|---|---|---|---|---|---|
| 1 | 1 | 150.30 | 17.39 | 6.26 | −4.89 |
| 2 | 6 | −19.58 | 21.66 | 0.65 | −16.94 |
| 3 | 17 | ∞ | 0.00 | 0.00 | −0.00 |
| 4 | 18 | ∞ | 0.00 | 0.00 | −0.00 |
| 5 | 19 | 39.20 | 44.78 | 21.04 | −31.03 |
| 6 | 32 | −89.81 | 23.70 | −6.76 | −23.98 |

Numerical Embodiment 6
Unit mm

Single lens data

| Lens | First surface | Focal length |
|---|---|---|
| 1 | 1 | −140.01 |
| 2 | 2 | 145.90 |
| 3 | 4 | 143.38 |
| 4 | 6 | −21.72 |
| 5 | 8 | −97.17 |
| 6 | 10 | −76.11 |
| 7 | 11 | 44.13 |
| 8 | 13 | −56.97 |
| 9 | 15 | 86.51 |
| 10 | 19 | 90.24 |
| 11 | 21 | 175.47 |
| 12 | 23 | 56.35 |
| 13 | 25 | −27.83 |
| 14 | 26 | 35.60 |
| 15 | 28 | −83.40 |
| 16 | 30 | 47.33 |
| 17 | 32 | 491.49 |
| 18 | 34 | −20.97 |
| 19 | 35 | 57.00 |
| 20 | 37 | 23.20 |
| 21 | 38 | −33.92 |

TABLE 1

| | Numerical Embodiment | | | | | |
|---|---|---|---|---|---|---|
| | 1 | 2 | 3 | 4 | 5 | 6 |
| Lens unit type | Positive, Negative, Positive, Negative, Positive, | Positive, Negative, Positive, Negative, Positive, | Positive, Negative, Positive, Negative, Positive, | Positive, Negative, Positive, Negative, Positive, | Positive, Negative, Positive, Positive, Negative, Positive, | Positive, Negative, Positive, Negative, |
| fw | 24.300 | 24.300 | 24.300 | 24.300 | 24.298 | 24.301 |
| ft | 294.950 | 294.970 | 294.990 | 294.990 | 294.992 | 199.914 |
| f1 | 154.140 | 157.460 | 143.570 | 152.700 | 155.880 | 150.303 |
| f2 | −20.260 | −22.710 | −19.460 | −19.880 | −20.754 | −19.579 |
| Configuration of second lens unit | Negative, Negative, Negative, Positive, Negative, Positive | Negative, Negative, Positive, Positive, Negative, Positive | Negative, Negative, Negative, Positive, Negative, Positive | Negative, Negative, Positive, Positive, Negative, Positive | Negative, Negative, Negative, Positive, Negative, Positive | Negative, Negative, Negative, Positive, Negative, Positive |
| Ar11 | 0.158 | 0.334 | 0.109 | 0.191 | 0.183 | 0.249 |
| Ar12 | −0.133 | −0.130 | −0.234 | −0.060 | −0.091 | −0.099 |
| Ar21 | 0.079 | 0.018 | 0.266 | 0.010 | 0.008 | 0.045 |
| Ea11 | 33.559 | 36.161 | 33.916 | 34.854 | 33.953 | 34.332 |
| Ea12 | 26.113 | 27.875 | 25.983 | 26.660 | 26.098 | 25.445 |
| Ea21 | 25.815 | 27.691 | 25.897 | 26.455 | 24.747 | 24.136 |
| N1 | 1.854 | 1.883 | 1.854 | 1.854 | 1.854 | 1.854 |
| N2 | 1.772 | 1.883 | 1.772 | 1.854 | 1.764 | 1.764 |
| Dasp3 | 6.068 | 9.133 | 6.534 | 8.672 | 10.086 | 10.468 |
| BLD2 | 21.561 | 23.854 | 22.592 | 22.959 | 20.957 | 21.662 |
| Asp1 | 0.009 | 0.017 | 0.006 | 0.010 | 0.010 | 0.013 |
| Asp2 | −0.009 | −0.009 | −0.017 | −0.004 | −0.006 | −0.007 |
| Asp3 | 0.005 | 0.001 | 0.018 | 0.001 | 0.001 | 0.003 |
| (1) Dasp3/BLD2 | 0.281 | 0.383 | 0.289 | 0.378 | 0.481 | 0.483 |
| (2) f1/fw | 6.343 | 6.480 | 5.908 | 6.284 | 6.415 | 6.185 |
| (3) −f2/fw | 0.834 | 0.935 | 0.801 | 0.818 | 0.854 | 0.806 |

Next, Embodiment in which the zoom lens described in Embodiments 1 to 6 is applied to an image pickup apparatus is described with reference to FIG. 14. The image pickup apparatus of the present invention includes an interchangeable lens apparatus including the zoom lens, and a camera main body. The camera main body is connected to the interchangeable lens apparatus via a camera mount portion in an attachable and detachable manner and includes an image pickup element configured to receive an optical image formed by the zoom lens and convert the optical image into an electric image signal.

FIG. 14 is a schematic diagram of a main part of a single-lens reflex camera. In FIG. 14, an image pickup lens 10 includes a zoom lens 1 of Embodiments 1 to 6. The zoom lens 1 is held by a lens barrel 2 serving as a holding member. A camera main body 20 includes a quick return mirror 3 for reflecting a light flux from the image pickup lens 10 to the upward direction, and a reticle plate 4 disposed in an image forming apparatus for the image pickup lens 10. The camera main body 20 further includes a penta roof prism 5 for converting an inverse image formed on the reticle plate 4 into an erect image, and an eyepiece lens 6 for observing the erect image.

As a photosensitive surface 7, there is disposed a solid state image pickup element (photoelectric converting element) such as a CCD sensor or a CMOS sensor for receiving the image formed by the zoom lens, or a silver halide film. When taking an image, the quick return mirror 3 is retracted from the optical path, and an image is formed on the photosensitive surface 7 by the image pickup lens 10. Benefits described in Embodiments 1 to 6 are effectively enjoyed by the image pickup apparatus disclosed in this Embodiment. The present invention can be also applied to a mirrorless single-lens reflex camera without the quick return mirror 3 as the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-225983, filed Nov. 6, 2014, which is hereby incorporated by reference herein in its entirety.

What is claimed is:

1. A zoom lens, comprising, in order from an object side to an image side:
    a first lens unit having a positive refractive power;
    a second lens unit having a negative refractive power; and
    a rear lens group that includes at least two lens units and has a positive refractive power over an entire zoom range,
    the zoom lens being configured such that intervals between adjacent lens units changes during zooming,
    the second lens unit comprising, at least two successively arranged negative lenses, the at least two successively arranged negative lenses including a first negative lens arranged closest to the object side and a second negative lens,
    wherein an object-side lens surface of the first negative lens comprises an aspherical lens surface having a positive aspherical surface amount; and
    of an image-side lens surface of the first negative lens, an object-side lens surface of the second negative lens, and an image-side lens surface of the second negative lens, at least one lens surface comprises an aspherical lens surface having a positive aspherical surface amount and at least one lens surface comprises an aspherical lens surface having a negative aspherical surface amount.

2. A zoom lens according to claim 1, wherein the following conditional expression is satisfied:

$$0.15 < Dasp/BLD2 < 0.60$$

where Dasp represents a distance on an optical axis from the lens surface of the second lens unit closest to the object side to a lens surface of the aspherical lens surfaces included in the second lens unit, which is closest to the image side, and BLD2 represents a distance on the optical axis from the lens surface of the second lens unit closest to the object side to a lens surface of the second lens unit closest to the image side.

3. A zoom lens according to claim 1, wherein the second lens unit comprises at least three negative lenses and at least two positive lenses.

4. A zoom lens according to claim 1, wherein the following conditional expression is satisfied:

$$4.0 < f1/fw < 8.0$$

where f1 represents a focal length of the first lens unit, and fw represents a focal length of the zoom lens at a wide angle end.

5. A zoom lens according to claim 1, wherein the following conditional expression is satisfied:

$$0.60 < |f2|/fw < 1.10$$

where f2 represents a focal length of the second lens unit, and fw represents a focal length of the zoom lens at a wide angle end.

6. A zoom lens according to claim 1, wherein the rear lens group consists of, in order from the object side to the image side, a third lens unit having a positive refractive power, a fourth lens unit having a negative refractive power, and a fifth lens unit having a positive refractive power.

7. A zoom lens according to claim 6, wherein, during zooming from a wide angle end to a telephoto end, the first lens unit, the third lens unit, the fourth lens unit, and the fifth lens unit are configured to move to the object side, and the second lens unit is configured to move to the object side and then move to the image side.

8. A zoom lens according to claim 6, wherein, during zooming from a wide angle end to a telephoto end, the first lens unit, the third lens unit, the fourth lens unit, and the fifth lens unit are configured to move to the object side, and the second lens unit is configured to move to the image side and then move to the object side.

9. A zoom lens according to claim 6, wherein, during zooming from a wide angle end to a telephoto end, the first lens unit, the third lens unit, the fourth lens unit, and the fifth lens unit are configured to move to the object side, and the second lens unit is configured to monotonically move to the object side.

10. A zoom lens according to claim 1,
    wherein the rear lens group consists of, in order from the object side to the image side, a third lens unit having a positive refractive power, a fourth lens unit having a positive refractive power, a fifth lens unit having a negative refractive power, and a sixth lens unit having a positive refractive power, and
    wherein all of the lens units are configured to move to the object side during zooming from a wide angle end to a telephoto end.

11. A zoom lens according to claim 1,
wherein the rear lens group consists of a third lens unit having a positive refractive power and a fourth lens unit having a negative refractive power, and
wherein all of the lens units are configured to move to the object side during zooming from a wide angle end to a telephoto end.

12. An image pickup apparatus, comprising:
a zoom lens comprising, in order from an object side to an image side:
  a first lens unit having a positive refractive power;
  a second lens unit having a negative refractive power; and
  a rear lens group that includes at least two lens units and has a positive refractive power over an entire zoom range,
  the zoom lens being configured such that intervals between adjacent lens units changes during zooming,
  the second lens unit comprising, at least two successively arranged negative lenses, the at least two successively arranged negative lenses including a first negative lens arranged closest to the object side and a second negative lens,
  wherein an object-side lens surface of the first negative lens comprises an aspherical lens surface having a positive aspherical surface amount; and
  of an image-side lens surface of the first negative lens, an object-side lens surface of the second negative lens, and an image-side lens surface of the second negative lens, at least one lens surface comprises an aspherical lens surface having a positive aspherical surface amount and at least one lens surface comprises an aspherical lens surface having a negative aspherical surface amount; and
an image pickup element configured to receive an image formed by the zoom lens.

\* \* \* \* \*